United States Patent [19]

Kinoshita

[11] Patent Number: 4,694,220

[45] Date of Patent: Sep. 15, 1987

[54] HIGH-SPEED FRAME PICK-UP CAMERA

[75] Inventor: Katsuyuki Kinoshita, Hamamatsu, Japan, 3,761,614

[73] Assignee: Hamamatsu Photonics Kabushiki Kaisha, Hamamatsu, Japan

[21] Appl. No.: 723,642

[22] Filed: Apr. 16, 1985

[30] Foreign Application Priority Data

Apr. 20, 1984 [JP] Japan ................................ 59-79794

[51] Int. Cl.[4] ........................ H01J 31/26; H04N 9/20

[52] U.S. Cl. ..................................... 315/10; 315/8.61; 313/365; 358/66

[58] Field of Search ........................ 315/399, 8.61, 10; 313/365, 2, 477 R; 358/209, 60, 66

[56] References Cited

U.S. PATENT DOCUMENTS

| | | | |
|---|---|---|---|
| 2,200,285 | 5/1940 | Lorenzen | 358/66 |
| 2,337,980 | 12/1943 | DuMont et al. | 358/66 |
| 3,071,706 | 1/1963 | Waldorf | 313/477 R |
| 3,761,614 | 9/1973 | Bradley | 315/10 |
| 3,900,760 | 8/1975 | Glenn et al. | 315/17 |
| 3,952,227 | 4/1976 | Van Alphen | 315/17 |

*Primary Examiner*—Theodore M. Blum

*Assistant Examiner*—David Cain

*Attorney, Agent, or Firm*—Spencer & Frank

[57] ABSTRACT

Electronic high-speed frame pick-up cameras for instantaneously or successively picking up an image of an object being observed while the structure and birghtness thereof are being changed at high speed. Each camera of this type consists of a first electron lens to reforming the photoelectronic image formed on the photoelectric layer, deflection means arranged so that the re-formed image of the photoelectronic image is located at the deflection center thereof, a singularity or plurality of second electron lenses arranged so that the electron beam deflected by the deflection means can be received thereby, a singularity or plurality of phosphor layers arranged to receive the electron beam sent from the second electron lens(es), a lens drive circuit to supply power to the first and second electron lenses, and a deflection means drive circuit to supply power to the deflection means. The exposure time and/or time interval between exposures in each camera of the present invention are of the order of 10 ns or less so as to pick up a frame or a plurality of frames for the image of the object being observed.

9 Claims, 27 Drawing Figures

HIGH-SPEED FRAME PICK-UP CAMERA

BACKGROUND OF THE INVENTION

The present invention relates to an electronic high-speed frame pick-up camera with an exposure time and time interval between exposures which are short enough to successively or instantaneously pick up an object whose structure or brightness changes at high speed.

The motion of two-dimensional objects with the elapsing of time can be observed by continuously operating a shutter at high speed so as to obtain a plurality of sequential frames of an image or an instantaneous frame of an image.

There are two types of high speed frame pick-up cameras; one of which obtains a plurality of contiguous image frames by mechanically rotating an optical device. i.e., a mirror or prism at high speed, and the other which them when an electric pulse voltage is applied to the imaging tube so as to generate an electronic image.

The latter or electronic camera, when compared with the former or mechanical camera, provides both exposure time and time intervals between exposures which are shorter than those of the former, and the latter is suitable for taking an image of an object moving at high speed.

FIG. 1 shows a cutaway view of an example of the conventional electronic high-speed frame pick-up camera constructed with an imaging tube.

The construction and operation of the normal type of imaging tube used with this camera will be described hereinafter with reference to FIG. 1.

Optical image 1 of an object being observed is focused on photoelectric layer 4 of an imaging tube through optical lens 2. Responding to the structure and brightness of the optical image being focused on photoelectric layer 4 to be observed, photoelectrons are emitted from the photoelectric layer 4. The optical image of object 1 being observed is converted into photoelectronic image 5 on the surface of the photoelectric layer 4 within a vacuum envelope.

Each portion of photoelectronic image 5 on photoelectric layer 4 emits a number of electrons which is directly proportional to the brightness thereof.

Photoelectronic image 5 is defined as a pattern formed by the distribution of electrons over the entire two-dimensional area on the photoelectric layer 4.

A negative high voltage VK applied to photoelectric layer 4 is negative with respect to another negative high voltage VM applied to mesh electrode 6.

Photoelectrons forming photoelectronic image 5 are accelerated by the potential difference between photoelectric layer 4 and mesh electrode 6 toward mesh electrode 6. The photoelectrons pass through mesh electrode 6 when arriving at the mesh electrode 6.

A negative high voltage applied to focusing electrode 107 is positive with respect to the negative high voltage VK applied to photoelectric layer 4. Anode 108 is kept at the common potential. Electrons move into deflection electrodes 109 after passing through mesh electrode 6.

An optical image on photoelectric layer 4 is converted into the corresponding photoelectronic image in less than one pico second at high speed. Photoelectronic images are generated one after another in accordance with the structure and brightness of the optical images changing with the elapsing of time, and the corresponding photoelectrons are moved one after another toward mesh electrode 6. This results in generation of the photoelectron beams from the photoelectric layer, and in moving of the photoelectron beams along the tube axis toward anode 108.

Two-dimensional information related to the structure and brightness of the optical image at each instant, which is represented by a two-dimensional photoelectron beam density pattern, appears in a plane perpendicular to the tube axis.

A series of two-dimensional photoelectron beam patterns can be seen on the planes perpendicular to the tube axis in a space between deflection electrodes 109*a* and 109*b* and the photoelectric layer 4 in such a manner that a pattern generated in a preceding time is arranged in the direction of the deflection electrodes with respect to another pattern generated at a later time.

If a series of the photoelectron patterns are arranged on phosphor layer 111 at time intervals appropriate to picking them up with a frame pick-up camera, a series of images can be obtained from the frame pick-up camera.

Photoelectrons emitted from photoelectric layer 4 with energies of up to the order of electron volts are dispatched at a variety of angles with respect to the photoelectric layer 4. This energy is low compared with that which is obtained by accelerating electrons until they arrive at anode 108 or the energy becomes 10 keV. Electrons constituting an arbitrary point on photoelectric layer 4, i.e., point A on the photoelectronic image, may be defocused while being accelerated toward deflection electrodes 109*a* and 109*b*.

An appropriate voltage higher than that applied to the photoelectric layer 4 is applied to focusing electrode 107 so as to constitute an electron lens in a space between the photoelectric layer 4 and the deflection electrodes 109*a* and 109*b*. If the photoelectron energies are distributed and if the photoelectrons move in a variety of directions, the spread electrons are concentrated into point A' on phosphor layer 111. These distributions, however, do not cause any problems. Focusing of a photoelectronic image is illustrated by the locuses of electrons in FIG. 1.

Locuses $P'_1$ and $P'_2$ in FIG. 1, which correspond to the zero initial velocity photoelectrons generated at points A and B on the photoelectric layer 4, are called the main locuses.

Locuses $P'_1$ and $P'_2$ in FIG. 1, which correspond to the $\epsilon o$ eV initial velocity photoelectrons dispatched from points A and B on the photoelectric layer 4 have angles ranging from $-\alpha$ to $+\alpha(0\leqq\alpha\leqq 90°)$ with respect to the normal lines passing through points A and B, respectively. On locuses $P'_1$ and $P'_2$ of the electrons, energies $\epsilon o$ are in the order of electron volts.

If proper voltages are applied to focusing electrode 107, locuses $P'_1$ and $P'_2$ can be intersected by main locuses $P_1$ and $P_2$ at points A' and B' on the phosphor layer 111, respectively.

This relation holds for any other points on photoelectronic image 5.

A pair of deflection electrodes 109 are set at the common potential to operate the imaging tube in the normal mode, and they have no effect on the locus of the electrons. Photoelectrons focused on the phosphor layer 111 strike the phosphor layer 111 at high speed and cause scintillation to form an output video signal corresponding to the optical image being input.

If any optical image being input moves beyond the limit to the response of the phosphor material, images formed on phosphor layer 111 are superimposed and no independent image can be displayed. Motion of the optical image being input is thus limited by the responses of the phosphor materials and by the characteristics of the human eye.

The operation of the frame pick-up camera will be described hereinafter.

For operating the imaging tube in the normal mode, DC voltage VK is applied to photoelectric layer 4 and zero voltage is applied to deflection electrodes 109*a* and 109*b* so that the deflection electrodes have no effect on the locuses of the electrons. For operating the imaging tube in the frame pick-up mode, voltages changing with time are applied to the photoelectric layer 4 and either deflection electrode 109*a* or 109*b*.

FIGS. 2(A) and 2(B) show the operation voltage applied to the photoelectric layer 4 and the deflection voltage applied to the deflection electrode when the imaging tube is operating in the frame pick-up mode.

Square wave voltage $W_1$ is applied to the photoelectric layer 4 and staircase waveform voltage $W_3$ is applied to the pair of deflection electrodes 109*a* and 109*b*. Let's observe the voltages applied to photoelectric layer 4 and mesh electrode 6. The same negative DC voltage VM as that for operation in the normal mode is applied to mesh electrode 6.

FIG. 2(A) shows the waveform when $W_2=VM$. Square wave voltage $W_1$ with interval $T_2$, whose potentials are successively specified as voltages $V'K(V'K>VM)$ and $VK(VK<VM)$, is applied to photoelectric layer 4.

An electronic shutter is formed by the potential difference between voltage $W_2(=VM)$ applied to mesh electrode 6 and voltage $W_1(V'K>VM>VK)$ applied to photoelectric layer 4.

If voltage $W_1$ applied to photoelectric layer 4 is V'K, it is higher than voltage VM applied to mesh electrode 6. Electrons emitted from photoelectric layer 4 are reflected from the mesh electrode 6 and thus no image can be obtained from the phosphor layer 111.

If voltage $W_1$ applied to photoelectric layer 4 is VK, it is lower than voltage VM applied to mesh electrode 6. Electrons emitted from photoelectric layer 4 are accelerated by the mesh electrode 6 and thus enter the space defined by focusing electrode 107.

Period $T_1$ is defined as the exposure time. The voltage applied to photoelectric layer 4 is specified as VK for exposure $T_1$, and the electronic shutter opens for this period of time. Period $T_2$ of square wave voltage $W_1$ is defined as the time interval between exposures.

Deflection electrode 109*b* is kept at the common potential which is the same potential as that of the imaging tube operating in the normal mode while such a staircase voltage waveform $W_3$ as shown in FIG. 2(B) is applied to deflection electrode 109*a*.

When passing through deflection electrodes 109, the photoelectron beam is deflected in proportion to the deflection voltage applied to the deflection electrodes 109, and it then arrives at phosphor layer 111.

FIG. 3 shows the positional relation of the output images for pictures picked up by the frame pick-up imaging system. When deflection voltage $VD_1$ is applied to deflection electrodes 109 as shown in FIGS. 2(B), electrons are focused on the location indicated by output image (1) on phosphor layer 111 in FIG. 3, corresponding to the optical image arriving at deflection electrodes 109 at times $t_1$ through $t'_1$. When deflection voltage $VD_2(=0)$ is applied to deflection electrodes 109, electrons are focused on the location indicated by output image (2) on phosphor layer 111 in FIG. 3, corresponding to the optical image arriving at deflection electrodes 109 at time $t_2$ through $t'_2$. When deflection voltage $VD_3$ is applied to deflection electrodes 109, electrons are focused on the location indicated by output image (3) on phosphor layer 111 in FIG. 3, corresponding to the optical image arriving at deflection electrodes 109 at times $t_3$ through $t'_3$. These output images (1) through (3) can be picked up by a conventional optical camera 113 as shown in FIG. 1 while the camera shutter is kept open for the time required to arrange the output images. The exposure time $T_1$ is important to permit picking up the frames of an image by the usual optical camera.

If $T_1$ is much greater than the time for changing optical image frames, the optical image frames are successively formed at the same locations of the phosphor layer 111 for the exposure time $T_1$ corresponding to the optical image frames being input. Different image frames are formed on the phosphor layer 111 and this results in inferior space frequency response.

If $T_1$ is much less than the time for changing optical image frames, an optical image frame forward by the photoelectron beam is cut off after a while and each output image becomes dark. If the optical image frame being input changes at moderate speed, $T_1$ should be large enough to provide a sufficient intensity within a limit to provide a satisfactory space frequency response. The optical image frames being input are still for time $T_1$ if $T_1$ is selected in such a manner as described above. The deflection electrodes are used to arrange the optical image frames on the phosphor layer 111 corresponding to each exposure time. The deflection voltage to cause the photoelectron beam to strike the same location on the phosphor layer should be unchanged at least during exposure time $T_1$.

Photographic camera 113 is used to record scintillation on the phosphor layer 111. This example shows that three images frames are recorded. A high-speed frame pick-up camera that cannot be realized by optical device can thus be realized by this method. This device, however, is limited in the following point:

The deflection voltage VD in the conventional high-speed frame pick-up camera, which is applied to deflection electrode 109*a*, must be unchanged during exposure time $T_1$. This can be realized if the time interval between exposures $T_2$ is large enough to pick up each image frame. However, the time interval between exposures $T_2$ cannot easily be decreased to the order of 10 ns or less.

Problems encountered in shortening exposure time $T_1$ and the time interval between exposures $T_2$ will be described hereafter referring to FIGS. 4(A) and 4(B). Waveform $W_4$ in FIG. 4(A) is defined as the voltage waveform which corresponds to such voltage waveform $W_1$ applied to photoelectric layer 4 as shown in FIG. 2(A), and waveform $W_5$ in FIG. 4(B) is defined as the voltage waveform which corresponds to such voltage waveform $W_3$ applied to deflection electrode 109*a* as shown in FIG. 2(B).

Voltage waveform $W_5$ should be a staircase-like waveform; however, it is deformed as shown in FIG. 4(B) and this deformation makes the spatial frequency response inferior.

When exposure time $T_1$ is of the order of 10 ns, waveform $W_4$ to be applied to the photoelectric layer 4 is deformed as shown in FIG. 4(A). When the potential on the photoelectric layer 4 is negative compared with that of the mesh electrode 6, the photoelectron beam causes the phosphor layer 111 to scintillate passing through the mesh electrode 6.

When the potential on the photoelectric layer 4 is other than VK at any point of time on such a potential gradient as shown in FIG. 4(A), scintillation can occur in the phosphor layer 111. An electron lens formed by the potential gradient has a capability to form a photoelectronic image on the phosphor layer 111 by focusing of the electron beam only when the potential on the photoelectric layer 4 is kept at VK. The photoelectronic image may be defocused at any other potential than VK. This means that such a waveform as shown in FIG. 4(A) may cause the spatial frequency response of the output image to be inferior.

Voltage waveform $W_4$, even if deformed, has an amplitude of the order of 10 to 100 volts. Voltage waveform $W_5$, even if deformed, has an amplitude of the order of 10 to 100 volts with a DC component of 1 to 2 kV. If $T_1$ and/or $T_2$ are/is of the order of 10 ns or less, an ideal circuit to generate such an ideal signal waveform as shown in FIGS. 2(A) and 2(B) cannot be constructed.

FIG. 5 shows a cutaway view of another example of the conventional electronic high-speed frame pick-up camra constructed with an imaging tube. Construction and operation of the normal type of imaging tube of this conventional camera will be described hereafter.

Optical image 1 of an object being observed is focused on photoelectric layer 4 of an imaging tube through optical lens 2. Responding to the structure and brightness of the optical image being focused on photoelectric layer 4 to be observed, photoelectrons are emitted from the photoelectric layer 4. The optical image of object 1 being observed is converted into photoelectronic image 5 on the surface of the photoelectric layer 4 within a vacuum envelope.

Each portion of photoelectronic image 5 on photoelectric layer 4 emits a number of electrons which is directly proportional to the brightness thereof. Photoelectronic image 5 is defined as a pattern formed by the distribution of electrons over the entire two-dimensional area on the photoelectric layer 4.

A negative high voltage VK applied to photoelectric layer 4 is negative with respect to another negative high voltage VM applied to mesh electrode 6.

Photoelectrons forming photoelectronic image 5 are accelerated by the potential difference between photoelectric layer 4 and mesh electrode 6 toward mesh electrode 6. The photoelectrons pass through mesh electrode 6 when arriving at the mesh electrode 6.

A negative high voltage applied to focusing electrode 107 is positive with respect to another negative high voltage VK applied to photoelectric layer 4. Anode 108 and phosphor layer 111 are kept at the common potential. Electrons move into phosphor layer 111 after passing through mesh electrode 6.

An optical image on photoelectric layer 4 is converted into the corresponding photoelectronic image in less than one pico second at high speed. Photoelectronic images are generated one after another in accordance with the structure and brightness of the optical images changing with the elapsing of time, and the corresponding photoelectrons are moved one after another toward mesh electrode 6. This results in generation of the photoelectron beams from the photoelectric layer, and in moving of the photoelectron beams along the tube axis toward phosphor layer 111.

Two-dimensional information related to the structure and brightness of the optical image at each time, which is represented by a two-dimensional photoelectron beam density pattern, appears in a plane perpendicular to the tube axis. A series of two-dimensional photoelectron beam patterns can be seen on the planes perpendicular to the tube axis in the space between phosphor lay 111 and the photoelectric layer 4 in such a manner that a pattern generated in a preceding time is arranged in the direction of the phosphor layer 111 with respect to another pattern generated at a later time. If the photoelectron pattern is arranged on phosphor layer 111 at a time appropriate for picking it up with a frame pick-up camera, an image frame can be obtained from the frame pick-up camera.

Photoelectrons emitted from photoelectric layer 4 with energies of up to the order of electron volts are dispatched at a variety of angles with respect to the photoelectric layer 4. This energy is low compared with that which is obtained by accelerating electrons until they arrive at anode 108 or the energy becomes 10 keV. Electrons constituting an arbitrary point on photoelectric layer 4, i.e., point A on the photoelectronic image, may be defocused while being accelerated toward anode 108.

An appropriate voltage higher than that applied to the photoelectric layer 4 is applied to focusing electrode 107 so as to constitute an electron lens in the space between the photoelectric layer 4 and the phosphor layer 111. If the photoelectron energies are distributed and if the photoelectrons move in a variety of directions, the spread electrons are concentrated into points A' on phosphor layer 111. These distributions, however, do not cause any problems. Focusing of a photoelectronic image is illustrated by the locuses of the electrons in FIG. 5.

Locuses $P_1$ and $P_2$ in FIG. 5, which correspond to the zero initial velocity photoelectrons generated at points A and B on the photoelectric layer 4, are called the main locuses.

Locuses $P'_1$ and $P'_2$ in FIG. 5 which correspond to the $\epsilon_0$ eV initial velocity photoelectrons dispatched from points A and B on the photoelectric layer 4 at angles ranging from $-\alpha$ to $+\alpha(0\leqq\alpha\leqq90°)$ with respect to the normal lines passing through points A and B, respectively. On locuses $P'_1$ and $P'_2$ of electrons, energies $\epsilon_0$ are in the order of electron volts.

If proper voltages are applied to focusing electrode 107, locuses $P'_1$ and $P'_2$ can be intersected by main locuses $P_1$ and $P_2$ at points A' and B' on the phosphor layer 111, respectively. This relation holds for any other points on photoelectronic image 5. Photoelectrons focused on the phosphor layer 111 strike the phosphor layer 111 at high speed and cause scintillation to form an output video signal corresponding to the optical image being input. If any optical image being input moves beyond the limit of the response of the phosphor material, images formed on phosphor, layer 111 are superimposed and no independent image can be display.

The motion of the optical image being input is thus limited by the responses of the phosphor materials and the characteristics of the human eye.

The operation of this frame pick-up camera will be described hereinafter.

For operating the imaging tube in the normal mode, DC voltage VK is applied to photoelectric layer 4. For operating the imaging tube in the electronic shutter mode, the voltage applied to the photoelectric layer 4 is changed.

FIG. 6 shows the operation voltage applied to the photoelectric layer 4 when the imaging tube is operating in the electronic shutter mode. Square wave voltage $W_1$ is applied to the photoelectric layer 4. Let's observe the voltages applied to the photoelectric layer 4 and mesh electrode 6.

The same negative DC voltage VM as that for operations in the normal mode is applied to mesh electrode 6.

FIG. 6 show the waveforms when $W_2=VM$. Square wave voltage $W_1$ whose potentials are successively specified as voltages $V'K(V'K>VM)$ and $VK(VK<VM)$ is applied to photoelectric layer 4.

An electronic shutter is formed by the potential difference between the voltage $W_2(=VM)$ applied to mesh electrode 6 and voltage $W_1(V'K>VM>VK)$ applied to photoelectric layer 4. IF voltage $W^1$ applied to photoelectric layer 4 is V'K, it is higher than voltage VM applied to mesh electrode 6. Electrons emitted from photoelectric layer 4 are reflected from the mesh electrode 6 and thus no image can be obtained from the phosphor layer 111.

If voltage $W_1$ applied to photoelectric layer 4 is VK, it is lower than voltage VM applied to mesh electrode 6. Electrons emitted from photoelectric layer 4 are accelerated by the mesh electrode 6 and thus enter the space defined by focusing electrode 107.

Period $T_1$ is defined as the exposure time. The voltage applied to photoelectric layer 4 is specified as VK for exposure time $T_1$, and the electronic shutter opens for this period of time.

Electrons emitted during the exposure time can only be focused on the phosphor layer 4 and scintillation occurs in the phosphor layer 4. The time of scintillation, depending on the types of phosphors, is a short period in the order of 10 $\mu$s to 1 ms.

The output image can be picked up by such optical camera 113 as shown in FIG. 5 while the camera shutter is kept open.

The exposure time $T_1$ is important to pick up an image frame by the usual optical camera.

If $T_1$ is much greater than the time for changing optical image frames, the optical image frames are successively formed on the same locations of the phosphor layer 111 for exposure time $T_1$ corresponding to the optical image frames being input. Different image frames are formed on the phosphor layer 111 and this results in inferior space frequency response.

If $T_1$ is much less than the time for changing optical image frames, an optical image frame formed by the photoelectron beam is cut off after a while and each output image becomes dark. If the optical image frame being input changes at moderate speed, $T_1$ should be large enough to provide a sufficient intensity within a limit providing a satisfactory space frequency response. The optical image frames being input are still for time $T_1$ if $T_1$ is selected in such a manner as described above.

Such a high-speed frame pick-up camera that cannot be realized by an optical device can thus be realized by this method. This device, however, is limited in the following point:

Problems encountered in a short exposure time ($T_1$) will be explained hereafter referring to FIG. 7. In FIG. 7, voltage waveform $W_1$ corresponds to voltage waveform $W_1$ applied to photoelectric layer 4 in FIG. 6.

When the exposure time $T_1$ is of the order of 10 ns or less, waveform $W_1$ to be applied to the photoelectric layer 4 is deformed as shown in FIG. 7.

When the potential on the photoelectric layer 4 is negative compared with that of the mesh electrode 6, the photoelectron beam causes the phosphor layer 111 to scintillate passing through the mesh electrode 6.

When the potential on the photoelectric layer 4 is other than VK at any point of time on such a potential gradient as shown in FIG. 7, scintillation can occur in the phosphor layer 111.

An electron lens formed by the potential gradient has a capability to form a photoelectronic image on the phosphor layer 111 by focusing of the electron beam only when the potential on the photoelectric layer 4 is kept at VK. The photoelectronic image may be defocused at any other potential than VK. This means that such a waveform as shown in FIG. 7 may cause the spatial frequency response of the output image to be inferior.

Voltage waveform $W_1$ of FIG. 7, even if deformed, has an amplitude of the order of 10 to 100 volts. If $T_1$ is of the order of 10 ns or less, an ideal circuit to generate such an ideal signal waveform as shown in FIG. 6 cannot be constructed.

An objective of the present invention is to present a new type of high-speed, frame pick-up camera capable of picking up a plurality of successive image frames which may change at high speed.

Another objective of the present invention is to present a new type of high-speed, frame pick-up camera capable of picking up an instantaneous image frame which may change at high speed.

SUMMARY OF THE INVENTION

A high-speed frame pick-up camera in accordance with the present invention uses an imaging tube providing a photoelectric layer whereon the formed images can be picked up by means of the high-speed frame pick-up camera. It consists of a first electron lens to re-form a photoelectronic image, deflection means arranged so that the re-formed image of the photoelectronic image is located at the deflection center, a plurality of second lenses whose central axis is arranged to agree with the deflection center so that the electron beam deflected by the deflection means can successively be received thereby, a plurality of phosphor layers respectively arranged in the locations of the image frames formed by the second lenses, a lens drive circuit to supply power to the first and second electron lenses, and a deflection means drive circuit to supply power to the deflection means.

To assure stable operation, the deflection means drive circuit in the configuration is constructed to supply power to the deflection means in such a manner that the speed of deflection changes with time. A starting circuit is contained in the deflection means drive circuit so that deflection starts synchronizing with the light emitted from the object being observed.

The high-speed, frame pick-up camera may be constructed by using a modified version of an imaging tube which consists of a photoelectric layer, phosphor layers, a plurality of electrodes forming electron lenses, and a pair of deflection electrodes. The deflection means consist of static deflection means wherein such a voltage gradient as shown in FIG. 8 ca be applied to the deflection electrodes.

The voltage gradient must be changed at extremely high speed for picking up image frames by a high-speed frame pick-up camera.

This deflection voltage can also be generated by using avalanche transistors or electron tubes.

The electron beam passing through specific portion wherein the voltage gradient becomes a specific value is sequentially picked up by the second electronic lenses so as to obtain image frames.

This eliminates the shuttering action of the mesh electrode, and assures picking up of high definition frames by its frame pick-up camera function even if exposure time $T_1$ and/or time interval between exposures $T_2$ is of the order of 10 ns.

Another high-speed frame pick-up camera in accordance with the present invention also uses an imaging tube providing a photoelectric layer whereon the formed images can be picked up by means of the high-speed frame pick-up camera. It consists of a first electron lens to re-form a photoelectronic image, deflection means arranged so that the re-formed image of the photoelectronic image is located at the deflection center, a second lens whose central axis is arranged to agree with the deflection center so that the electron beam deflected by the deflection means can be received thereby, a phosphor layer arranged in the location of the image frame formed by the second lens, a lens drive circuit to supply power to the first and second electron lenses, and a deflection means drive circuit to supply power to the deflection means.

To assure stable operation, the deflection means drive circuit in the configuration is constructed to supply power to the deflection means in such a manner that the speed of deflection changes with time. A starting circuit is contained in the deflection means drive circuit so that deflection starts synchronizing with the light emitted from the object being observed.

The high-speed, frame pick-up camera may be constructed by using a modified version of an imaging tube which consists of a photoelectric layer, a phosphor layer, an electrode forming electron lens and a pair of deflection electrodes. The deflection means consists of static deflection means wherein such a voltage gradient as shown in FIG. 17 can be applied to the deflection electrodes.

The voltage gradient must be changed at extremely high speed for picking up image frames by high-speed frame pick-up camera.

This deflection voltage can also be generated by using avalanche transistors or electron tubes. The electron beam passing through specific portion wherein the voltage gradient becomes a specific value is picked up by the second electronic lens so as to obtain an image frame.

This eliminates the shuttering action of the mesh electrode, and assures picking up of a high definition frame by its frame pick-up camera function even if exposure time $T_1$ is of the order of 10 ns or less.

DESCRIPTION OF THE PREFERRED EMBODIMENTS

Figure 1:
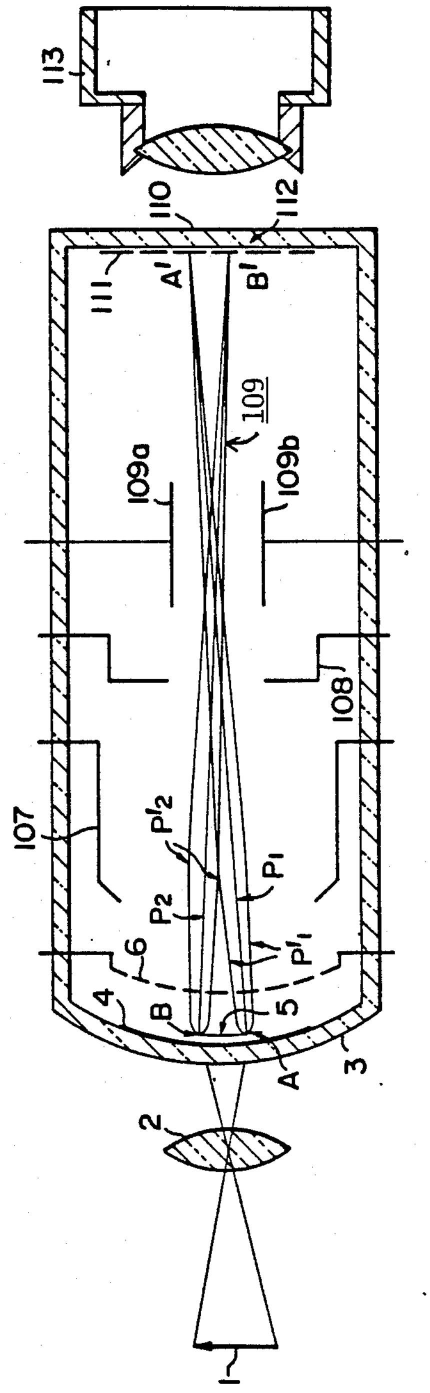
FIG. 1 PRIOR ART
FIG. 1 is a cutaway view of the conventional high-speed frame pick-up camera along the tube axis.
Figure 2A:
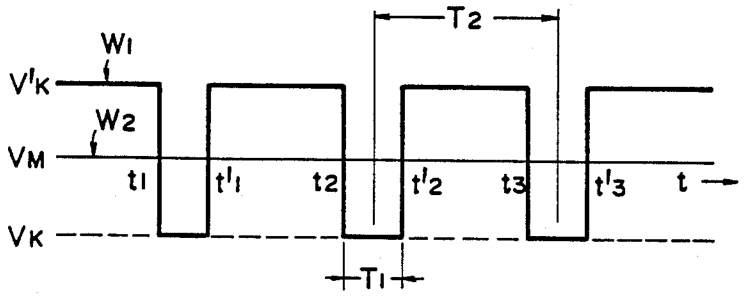
FIGS. 2(A) and 2(B) show the waveforms of the voltages which are applied to the mesh electrode and deflection electrodes of the high-speed frame pick-up camera, FIG. 2(A) showing the waveform when $W_2=VM$, FIG. 2(B) showing the waveform of a staircase voltage waveform $W_3$.
Figure 2B:
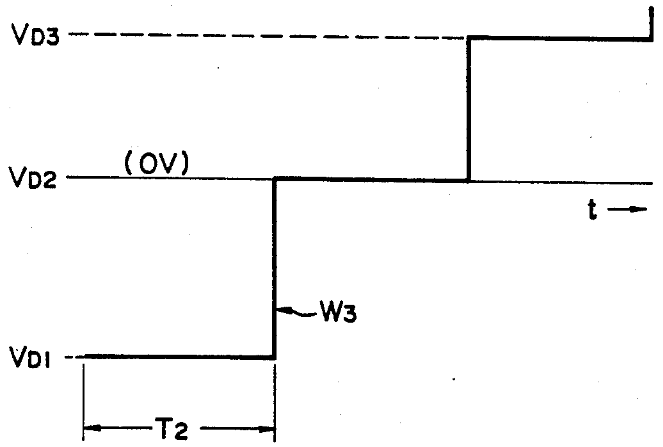
Figure 3:
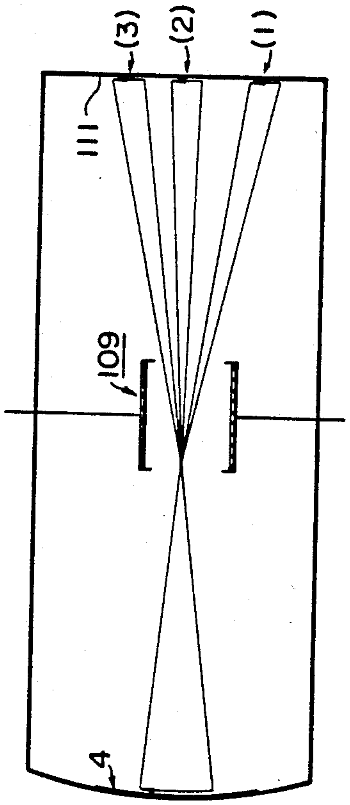
FIG. 3 is a cutaway view for explaining the positional relation of the output images for pictures picked up by the frame pick-up imaging system.
Figure 5:
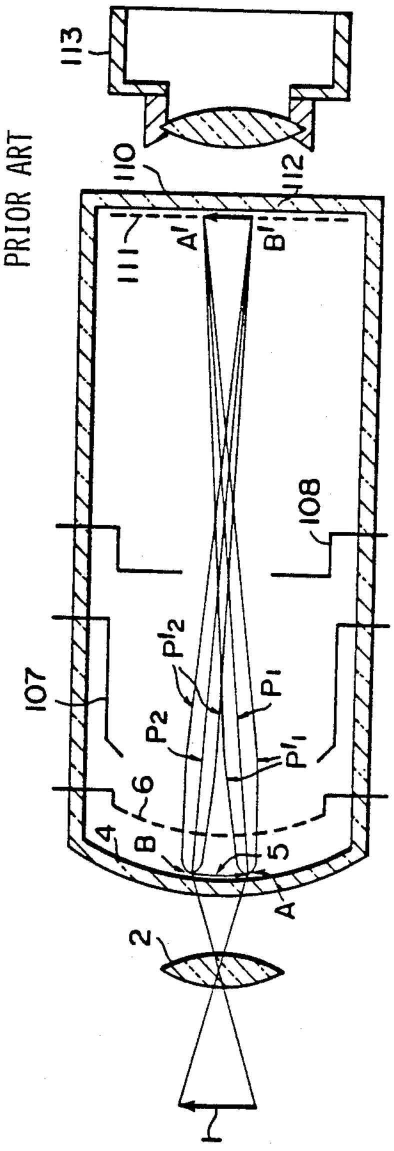
PRIOR ART FIG. 5
FIG. 5 is a cutaway view of another example of the conventional electronic high-speed frame pick-up camera constructed with an imaging tube.
Figure 4A:
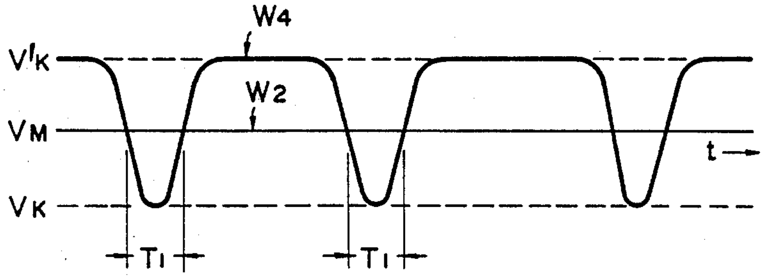
FIGS. 4(A) and 4(B) show waveforms of the voltages applied to the mesh electrode and deflection electrodes, which explains distortion of these waveforms in the conventional high-speed frame pick-up camera.
Figure 4B:
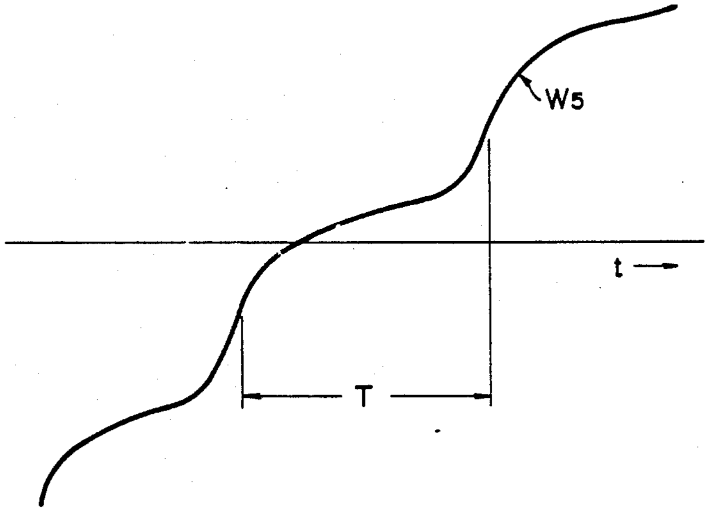
Figure 6:
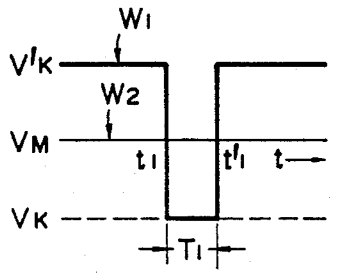
FIG. 6 shows the waveforms of the voltages which are applied to the mesh electrode and photoelectric layer of the conventional high-speed frame pick-up camera.
Figure 7:
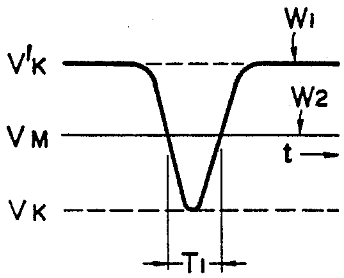
FIG. 7 shows the waveforms of the deformed voltage.
Figure 8:
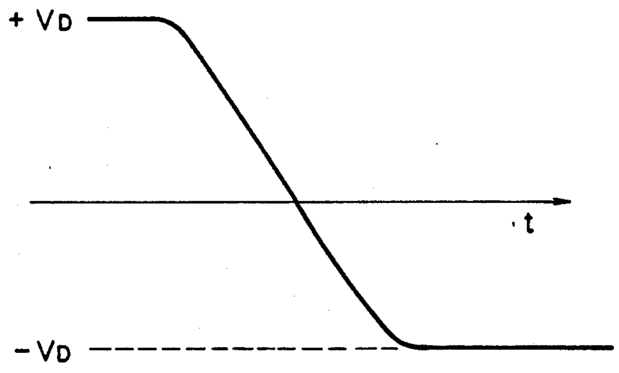
FIG. 8 is a graph illustrating the change in the voltage applied to the deflection electrodes of the high-speed frame pick-up camera in accordance with the first objective of the present invention.
Figure 9:
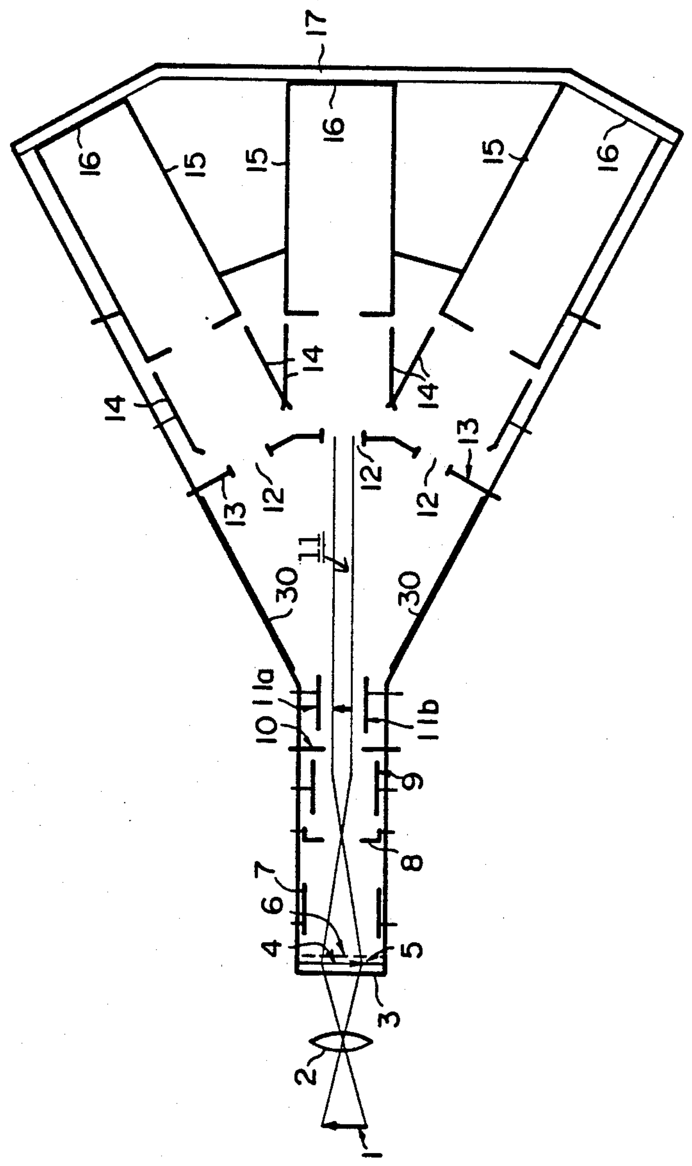
FIG. 9 is a cutaway view of a first embodiment of the high-speed frame pick-up camera in accordance with the present invention.

FIG. 9 shows a cutaway view of the first embodiment of the electronic high-speed frame pick-up camera tube in accordance with the first objective of the present invention when cut along the tube axis.

The structure within a sealed vacuum envelope consists of first electronic image forming means, photoelectron beam shutter and projection means to determine the exposure time and to arrange a series of photoelectronic image frames on a plurality of phosphor layers, and second electronic image forming means.

The first electronic image forming means consists of a sealed light-incident window 3 constituting a portion on a sealed wall and providing a capability to receive an incident image, photoelectric layer 4 to convert the incident image into photoelectronic image frames, the incident image frames being formed on the rear side of the sealed light-incident window 3, and a plurality of electrodes to form an image on the plane perpendicular to the tube axis in accordance with photoelectronic image 5 generated from the photoelectric layer while the photoelectron beam is passing through the center of a pair of deflection electrodes 11 arranged along the tube axis.

The plurality of the electrodes which are sequentially arranged along the tube axis normal to the photoelectric layer 4 at the center thereof consist of mesh electrode 6 symmetrical with respect to the tube axis, first focusing electrode 7, first anode 8 with an aperture at the center thereof, electron beam angle adjustment electrode 9 to adjust the angle of the photoelectron beam when the photoelectron beam is incident on the deflection electrodes and second electron image forming means, and shielding electrode 10 to shield the electric field formed by the respective electrodes so that the potentials at deflection electrodes 11 arranged adjacent to the electron beam angle adjustment means 9 do not interact with other electrodes and providing an aperture at the center whereof the photoelectron beam can pass through.

The photoelectron beam shutter and projection means are provided to determine the exposure time, to arrange a series of photoelectronic images on a plurality of phosphor layers or screens, and to project the photoelectronic images on the respective phosphor layers or screens at the outputs so that they can be exposed for the time of one frame. The photoelectron beam shutter and projection means consist of a pair of deflection electrodes 11 and photoelectron beam blocking electrode 13 providing a plurality of apertures that are suited to block the photoelectron beam.

Deflection electrodes 11 consisting of a pair of planar metal plates 11*a* and 11*b* are used to deflect the photoelectron beam emitted from photoelectric layer 4.

The photoelectron beam blocking electrode 13 provides a plurality of apertures 12 that are suited to project the photoelectron beam onto the respective screens when the photoelectron beam can pass through these apertures for the time defined in each frame as exposure time $T_1$.

A plurality of apertures 12 are arranged so that the center of the photoelectron beam spreading in accordance with the deflection thereof can pass through the centers of the apertures 12. Each aperture may be of circular structure or of rectangular structure whose one side is parallel with the plane of the drawing and the other side is perpendicular to the plane of the drawing.

Exposure time $T_1$ is given by the time that the electron beam being scanned passes through the respective aperture. The time interval between exposures $T_2$ is given by the interval from the time that the electron beam being scanned passes through the center of an aperture to the time that the next electron beam being scanned passes through the center of that aperture. Times $T_1$ and $T_2$ will be explained hereinafter together with the operation of the imaging tube.

The surface of each aperture of the photoelectron beam blocking electrode 13 is arranged perpendicular to the electron beam arriving thereat so that a plurality of lines each connecting the central position between adjacent apertures 12 to the center of the pair of deflection electrodes 11 are arranged at every predetermined angle. The number of apertures is unlimited unless the photoelectron beam touches the edge of the deflection electrodes or a plurality of electrodes forming an electron lens successively connected to aperture 12. The distance between the center of the deflection electrodes 11 and each aperture 12 is set to be equal. The number of apertures 12 corresponds to the number of frames. The frame pick-up camera in accordance with the first embodiment of the present invention has three apertures to pick up three frames.

The second electronic image forming means provides the capability to re-form a series of photoelectronic image frames formed on the plane in the intermediate location of the deflection electrodes along the tube axis and to project each frame on each phosphor layer or screen 16. Each aperture has its own second electronic image forming means consisting of second focusing electrode 14, second anode 15, screen 16 made by depositing a phosphor layer, and sealed light-emitting window 17, which are arranged along the line (or axis) leading from the center of the deflection electrodes 11 to that of each aperture 12.

Figure 10:
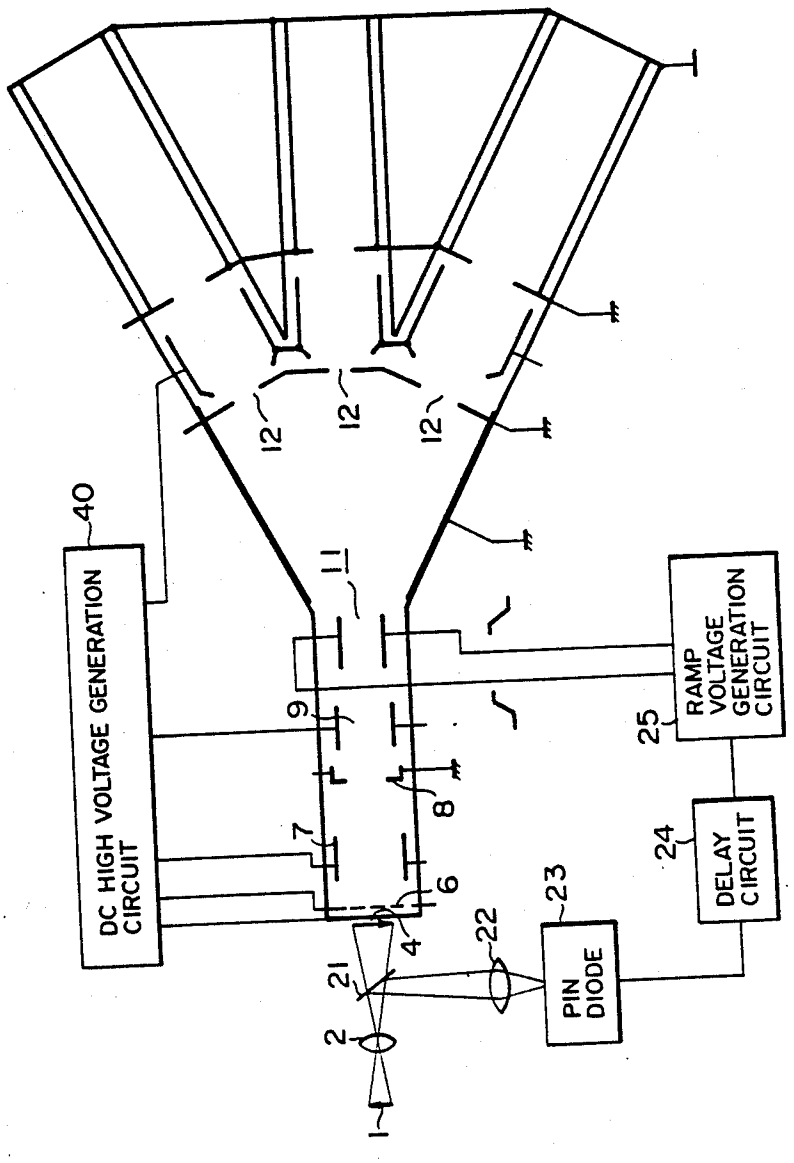
FIG. 10 shows a block diagram of the first embodiment of the high-speed frame pick-up camera according to this invention.

FIG. 10 is a block diagram showing the above first embodiment shown in FIG. 9. Since the electron tube of the high-speed, frame pick-up camera has been described referring to FIG. 9, it is schematically described in FIG. 10.

Optical lens 2 is used to form on photoelectric layer 4 the image of object 1 being observed.

Half-mirror 21 is arranged in a space between lens 2 and photoelectric layer 4, and the light from object 1 being observed is partly led down to lens 22. The light led from object 1 being observed is led to PIN diode 23 operated as a high-speed light sensor after passing through lens 22.

The output of PIN diode 23 is fed to delay circuit 24 wherein the output is delayed by a specified time so as to feed it to ramp voltage generation circuit 25. Ramp voltage generation circuit 25 to drive the deflection electrodes 11 operated as deflection means in the present invention is started by both PIN diode 23 and delay circuit 24.

The gradient of the ramp voltage can arbitrarily be specified by the time interval between adjacent frames of an image being observed or by the exposure time. The trigger to specify the start of the ramp voltage determining the starting time of the image frames to be displayed as outputs is generated by the starting circuit.

The operating voltages supplied from DC high voltage generation circuit 40 are applied to the electrodes of the first and second electronic image forming means.

The voltages and their changes at the respective electrodes will be explaned hereinafter.

The operation of this first embodiment of the high-speed frame pick-up camera of the present invention will now be described.

The optical image of the object being observed, whose structure and brightness may change at high speed, is incident on photoelectric layer 4 passing through optical lens 2 and sealed window 3. Photoelectric layer 4 can respond to the optical image change, if any, in less than 1 ps, and the optical image is converted into the corresponding photoelectric image at extremely high speed. An operating voltage of −10 kV DC supplied from DC high voltage generation circuit 40 is applied to photoelectric layer 4, and a voltage of −8.5 kV DC is applied to mesh electrode 6 located adjacent to photoelectric layer 4. The electron beam forming this photoelectronic image is thus accelerated in the direction of mesh electrode 6.

Figure 11:
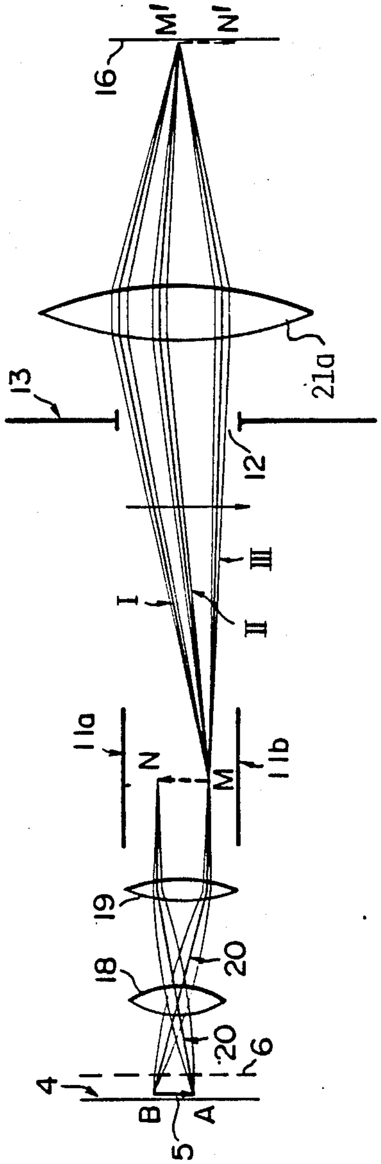
FIG. 11 shows an electro-optical system in the first embodiment of the present invention.

Since the light is continuously incident on the photoelectric layer 4, photoelectrons are successively generated and the photoelectron beam emitted from photoelectric layer 4 travels toward deflection electrodes 11 along the tube axis. The cross-sectional area of the photoelectron beam, perpendicular to the tube axis, stores two-dimensional information representing the structure and brightness of the optical image frames at each time in the form of the spatial electron density. Two-dimensional information stored in the cross-sectional area of the photoelectron beam starting from photoelectric layer 4 travels along the tube axis toward deflection electrodes 11 as time elapses. Photoelectronic image 5 becomes defocused as time goes on. If an appropriate DC voltage is applied to first focusing electrode 7, the photoelectronic image is re-formed in the cross-sectional area of the photoelectron beam perpendicular to the tube axis while passing through the intermediate location of the deflection electrodes 11. FIG. 11 shows the locuses of the electron beams in the optogeometrical system drawn in place of the electro-optic system. In FIG. 11, the locuses of electrons forming points A and B on the photoelectronic image are shown. Reference number 20 indicates the main locuses of photoelectrons emitted from points A and B.

The locuses on both sides of the main locuses indicate the locuses of photoelectrons emitted from the photoelectric layer 4, each having an arbitrary energy, and they have tangential lines with arbitrary angles with respect to the normal line to the photoelectric layer at points A and B. This type of locus is called the β-locus.

Main locus 20 can be plotted with respect to an arbitrary point on the optical image projected onto the photoelectric layer; however, main locuses 20 are plotted with respect to points A and B.

The main locuses are set in parallel with each other or concentrated by adjusting electron lens 19 when the photoelectron beam is passing through deflection electrodes 11 and apertures 12. Known is the fact that the divergent angles of the main locuses can be adjusted by electronic lens 19. Electron lenses 18 and 19, shown in FIG. 11, can be constructed mainly by using first focusing electrode 7 and electron beam angle adjustment electrode 9, as shown in FIG. 9, respectively.

In the first embodiment of the present invention, electron lens 18 consists of mesh electrode 6 whereto a voltage of −8.5 kV DC is applied, first focusing electrode 7 whereto −8.8 kV DC is applied, and first anode 8 whereto the common voltage is applied. Electron lens 19 consists of first anode 8 whereto the common voltage is applied, electron beam angle adjustment electrode 9 whereto a voltage of −7 kV DC is applied, and shielding electrode 10 whereto the common voltage is applied. An electronic image can be formed on the plane perpendicular to the tube axis while the electron beam is passing through the intermediate location of the deflection electrodes 11 along the tube axis. The main locuses are set in parallel with each other or concentrated by electron lens 19 when the photoelectron beam is passing through deflection electrodes 11 and apertures 12 because of the following operations which will be explained referring to the operation of the shutter means as well as formation of the next photoelectronic image.

The photoelectron beam incident on the plane at the intermediate location of the deflection electrodes 11 can be scanned on the surface of photoelectron beam blocking electrode 13 by the deflection voltage being applied to deflection electrodes 11.

Figure 12:
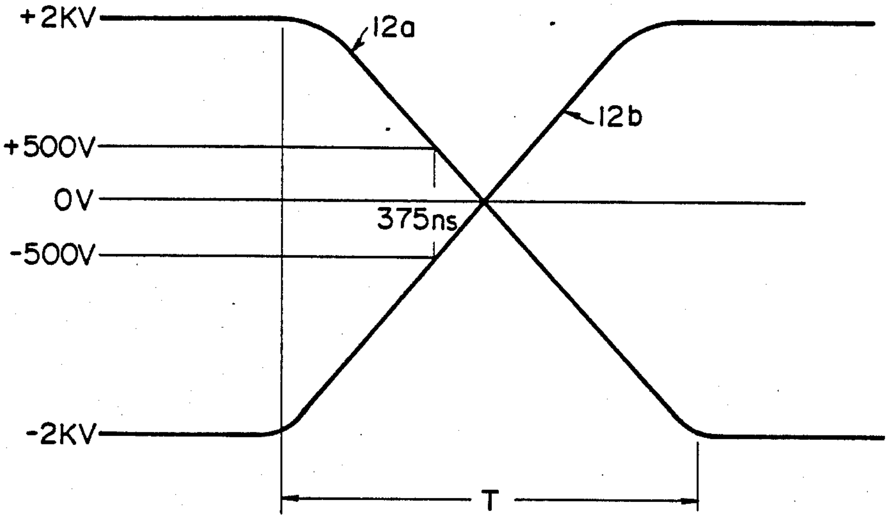
FIG. 12 shows waveforms of the voltages applied to the deflection electrodes in the first embodiment of the present invention.

FIG. 12 shows the waveform of the deflection voltage, wherein reference numbers 12*a* and 12*b* indicate the voltages which are applied to deflection electrodes 11*a* and 11*b*, respectively.

In the first embodiment of the present invention, a pair of symmetrical voltages are applied to a pair of deflection electrodes as shown in FIG. 12. However, it is possible for scanning of the photoelectron beam that a ramp voltage is applied to one of the deflection electrodes while the other deflection electrode is kept at the common potential.

The deflection electrodes are specified as 2 cm in width, 2 cm in length along the tube axis, and 1 cm in gap between a pair thereof. If a voltage of −10 kV DC is applied to photoelectric layer 4 with shielding electrode 10 kept at the common potential, photoelectrons which are accelerated by an energy of 10 keV are incident on a pair of deflection electrodes 11.

The photoelectron beam incident on a pair of deflection electrodes 11 is deflected only by the force normal to the tube axis.

The photoelectron beam speed along the tube axis remains unchanged after the beam is incident on the deflection electrodes 11. Since the length of deflection electrodes 11 along the tube axis is specified as 2 cm, the time which elapses as the electron beam passes through the deflection electrodes 11 measures approximately 340 ps at an energy of 10 keV.

How the photoelectron beam passing through deflection electrodes 11 is deflected depends on whether the deflection voltages applied to the deflection electrodes are apparently unchanged or drastically changed while the photoelectron beam passes through the deflection electrodes 11.

Deflection of the photoelectron beam passing through deflection electrodes 11 in such a condition that the deflection voltages applied to the deflection electrodes 11 are apparently unchanged will be described hereinafter.

Consider that time T is specified as 1000 ns for such a deflection voltage waveform as shown in FIG. 12. The deflection voltage is unchanged at any position on the voltage gradient while the photoelectron beam moving at an energy of 10 keV is passing by the deflection electrodes 11.

Next, define as zero the time that the ramp voltage starts rising as shown in FIG. 12. Then, voltages of +500 V and −500 V are applied to deflection electrodes 11*a* and 11*b* in a time of 375 ns after the start of the ramp voltage, respectively.

Figure 13:
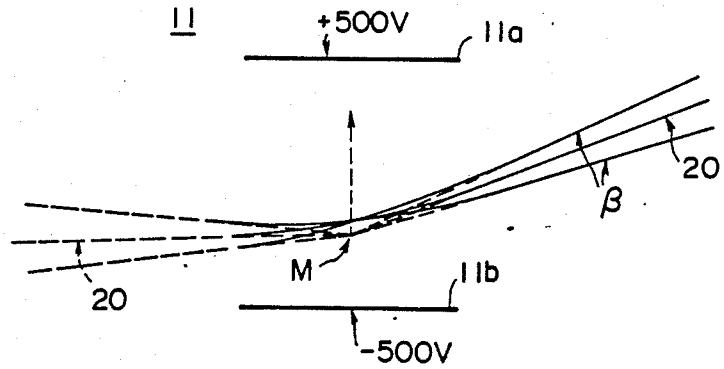
FIG. 13 shows locuses of the electron beams passing through the deflection electrodes in the first embodiment of the present invention.

How to deflect the photoelectron beam passing through the deflection electrodes 11 when the above deflection voltage is applied to the deflection electrodes 11 will be described hereafter referring to FIG. 13.

The arrow M indicated by the broken line at the intermediate location of the deflection electrodes 11 perpendicular to the tube axis indicates the photoelectronic image formed when the deflection voltage applied to deflection electrodes 11 is kept at the common potential (which implies zero electric field for deflection).

The other three broken lines leading to point M from the left bottom of the arrow indicate the image to be formed by both the main and $\beta$ locuses at point M when the deflection voltage is zero volt. The photoelectron beam travels along the straight line leading from the left edge of deflection electrodes 11 to point M because of the zero electric field.

Although the locus extending beyond point M when the deflection voltage is zero volt is not indicated, the photoelectron beam travels along the straight line and thus the image becomes defocused.

However, a voltage of +500 V DC is applied to deflection electrode 11*a* and a voltage of −500 volts DC to deflection electrode 11*b*. The photoelectron beam which is incident on the deflection electrodes 11 is bent along the parabolic locuses as shown by the solid line in FIG. 13.

The photoelectron beam passing by the deflection electrodes 11 is incident on both tube wall electrode 30 and photoelectron beam blocking electrode 13, which are kept at the common potential, whereto zero electric field is applied. The photoelectron beam thus travels along a straight line. That is, the photoelectron beam passing by the deflection electrodes 11 whereto an electric field for deflection is applied travels along the straight line with such a tangential angle that the main and $\beta$ locuses of the photoelectron beam go to point M when extending the locuses toward the inside of the deflection electrodes 11.

The above description explains the case that voltages of +500 V DC and −500 V DC are applied to a pair of deflection electrodes 11; however, the other voltages are applied to a pair of deflection electrodes 11 at any other time as shown in FIG. 12.

The position and tangential angle of the photoelectron beam passing by the deflection electrodes 11 are not the same as those obtained when voltages of +500 V DC and −500 V DC are applied to the deflection electrodes; however, the photoelectron beam passing by the deflection electrodes travels along the straight line with such a tangential angle that the main and $\beta$ locuses of the photoelectron beam go to point M when extending the locuses toward the inside of the deflection electrodes 11.

The photoelectron beam passing by the deflection electrodes 11 and travelling along such a straight line that the photoelectron beam is focused at point M when a zero electric field is applied to a pair of deflection electrodes 11 is equivalent to the photoelectron beam dispatched from point M along an arbitrary line. This relation holds for any photoelectron beam angle other than that for zero electric field.

Although the above description explains the operations referring to point M, the above relation holds for any other point than point M.

The present invention can be realized in accordance with the above principle. Assume that the light is incident on a plane other than the intermediate plane of the deflection electrode 11 when the deflection voltage is other than zero volt. In this case, one can easily calculate the locuses and obtain the following: The photoelectron beam (travelling on the main and $\beta$ locuses) which diverges from an arbitrary point on the re-formed image is deflected by the deflection electrodes 11, and travels along a straight line. The photoelectron beam thus moves as if the photoelectron beam seems to be dispatched from a specific point. The point whereat the straight line starts depends on the deflection voltage. That is, a different point is designated for each different deflection voltage. Unlike the photoelectronic image formed on the plane at the intermediate point of the deflection electrode 11, the photoelectron beam travels as if the photoelectron beam is dispatched from different points for different deflection voltages.

The above is the reason why a photoelectronic image is formed on the plane perpendicular to the tube axis in the intermediate location of the deflection electrodes 11.

If time T is specified as 1.5 ns in such a deflection voltage waveform as shown in FIG. 12, the time required to pass the photoelectron beam through the deflection electrodes 11 is approximately 340 ps and the voltage applied to the deflection electrodes 11 may change during this time. In a situation wherein the photoelectronic image generated from the photoelectric layer 4 is re-formed on the plane perpendicular to the tube axis after passing through the intermediate location of the deflection electrodes 11 along the tube axis when zero volt is applied to deflection electrodes 11, how to deflect the photoelectron beam has been discussed above.

The results are as follows:

The main and $\beta$ locuses diverging from arbitrary point Q on the plane of the photoelectronic image at the intermediate location of the deflection electrodes 11 whereto zero voltage is applied are focused on a specific point on the plane at the intermediate location of the deflection electrodes 11 perpendicular to the tube axis at an arbitrary point of time while the ramp-wave voltage is being generated. This designated point is located at distance d apart from focusing point Q established when no electric field is applied to the deflection electrodes 11 on the intermediate plane in the direction which is opposite of that of the photoelectron beam scanning. The specific distance d is given in terms of the length of deflection electrode 11, the speed of the photoelectron beam motion along the tube axis, and the deflection voltage change with time.

If the photoelectron beam is deflected into the left or right direction to such a great extent that the deflection voltage greatly changes while the photoelectron beam is passing through deflection electrodes 11, the photoelectronic image is formed on the plane at the intermediate location of the deflection electrode perpendicular to the tube axis and shifted in the direction opposite to that of the photoelectron beam scanning by distance d from the photoelectronic image formed when zero deflection voltage is applied to the deflection electrodes. The photoelectron beam seems to linearly diverge from the above virtual light source.

The photoelectron beam is moved by the ramp voltage applied to the deflection electrodes 11 on the apertures of photoelectron beam blocking electrode 13 as shown in FIG. 11. However, the photoelectron beam seems to linearly diverge from the virtual quiescent photoelectronic image source within the deflection electrodes 11.

When the photoelectron beam is incident on electron lens 21*a* with such a diameter that the spherical aberration can be disregarded, electron lens 21*a* is used to form a virtual quiescent image on the respective screen although the photoelectron beam is scanned by shifting the electron lens 21*a*.

FIG. 11 shows the motion of beams I, II, and III when the deflection voltage is recognized to be unchanged while the photoelectron beam is passing through the deflection electrodes 11. FIG. 11 shows the photoelectron beam consisting of both main and $\beta$ locuses through which electrons forming point B of photoelectronic image 5 on the photoelectric layer when zero deflection voltage is applied to the deflection electrodes 11 are focused at point M on the plane at the intermediate location of the deflection electrodes 11. The photoelectron beam is deflected in the direction indicated by arrows in FIG. 11 by deflection electric field in such a manner that beams I, II and III successively appear in FIG. 11 as deflection is carried out. Photoelectron beams I, II and III are recognized to linearly diverge from point M, and they are focused on point M′ by electronic lens 21.

Beams I and III are the beams which have passed through opposite edges of apertures 12, and the scanning time between the time that the beam locus is given as beam I and the time that the beam locus is given as beam III is the exposure time.

The photoelectron beam passing through point B is focused on point M′ during the exposure time. The photoelectron beam passing through another point, i.e., point A, is focused on point N′.

The photoelectronic image is focused on the point shifted upward by distance d from that indicated by points M and N within the deflection electrodes 11 in FIG. 11, even if the deflection voltage is changed while the photoelectron beam is passing through the deflection electrodes 11.

This implies that the reproduced image on the phosphor layer cannot be defocused by the shift of the image due to the electric field change by deflection even if the ramp voltage is being applied to the deflection electrodes in place of the staircase waveform. Thus, the image on the phosphor layer can be held in the quiescent state not by the staircase waveform which is applied to the deflection electrodes 11 but by the ramp voltage waveform durin the exposure time.

The time required for the photoelectron beam deflected by the deflection electrodes 11 to travel across aperture 12 on photoelectron beam blocking electrode 13 defines the exposure time.

The main locuses which enter into deflection electrodes 11 by electron lens 19 are set parallel with each other or concentrated because the aperture pitch is to be spread and the aperture length is to be elongated into the direction of deflection if the main locuses are spread before entering into the photoelectron beam blocking electrode 13 having apertures. This reduces the number of frames to be picked up and the spherical aberration is increased if an electron lens 21 with a small diameter is used.

The above operation has been explained for an aperture on photoelectron beam blocking electrode 13, and the same relation holds for another aperture.

The time interval between exposures is given by the scanning time for the photoelectron beam between the centers of adjacent apertures.

Second electronic image forming means consists of electron lens 21*a* and phosphor layer 16 in FIG. 11.

Electron lens 21*a* consists of photoelectron beam blocking electrode 13 (kept at the common potential), second focusing electrode 14 (kept at −8 kV DC), and second anode 15 (kept at the common potential) as shown in FIG. 9. Second electron image forming means and electron lens 21*a* are provided in each aperture 12, and the apertures are provided for the respective frames. The electro-optical system is as described above. Three extremely short exposure time frames of an image can successively be displayed on the respective phosphor layers or screens 16 when part of the light from object 1 being observed is detected by the starting circuit if the ramp voltage is generated by the ramp voltage generation circuit 25.

Figure 14:
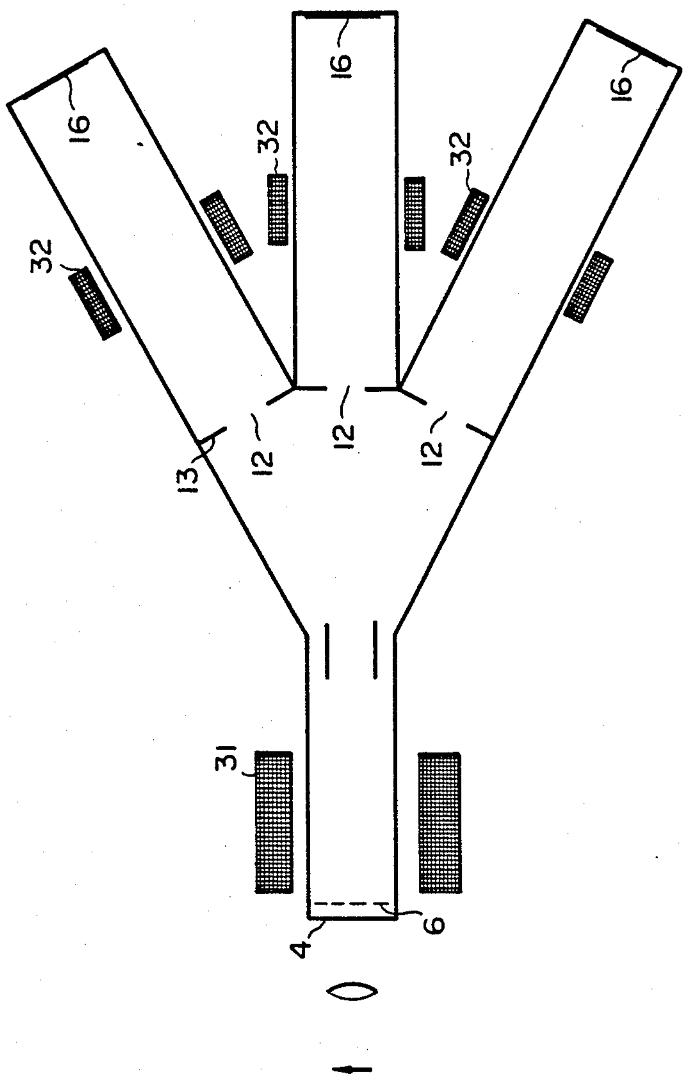
FIG. 14 is a cutaway view of a second embodiment of the high-speed frame pick-up camera in accordance with the first objective of the present invention.

The first and second electronic lenses 18 and 19 in this embodiment of the present invention can be replaced with such magnetic field focusing coils as shown in FIG. 14. First focusing coil 31 can be used in place of such an electronic lens as shown in FIG. 11. Second focusing coil 32 can be used in place of electronic lens 21*a*.

Figure 15A:
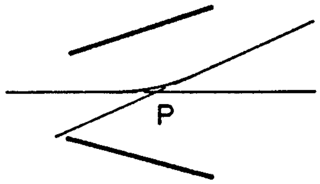
FIGS. 15(A) and 15(B) show variations of static deflection means in the second embodiment.
Figure 15B:
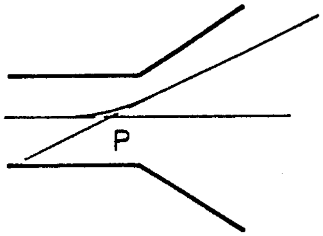

In the first embodiment of the present invention, mesh electrode 6 is used. Mesh electrode 6 is not always necessary but the exposure time ($T_1$) and time interval between exposures ($T_2$) are limited to 10 ps or less unless mesh electrode 6 is used. Photoelectron beam angle adjustment electrode 9 is not always necessary but the aperture size and span between apertures are increased. This increases the size of the apparatus. A pair of deflection electrodes consisting of a pair of parallel planar electrodes are used in this preferred embodiment of the present invention. However, such deflection electrodes as shown in FIGS. 15(A) and 15(B) can also be used. The deflection electrodes shown in FIGS. 15(A) and 15(B) improve the deflection sensitivity and prevent the photoelectron beam from touching at the right-hand side edge thereof.

The improved deflection electrodes can be used for forming the photoelectronic image on the plane perpendicular to the tube axis at the specific location of the deflection electrodes. How to designate the above specific location is important, and this location is specified as the center of the deflection electrodes along the tube axis if the deflection electrodes consist of a pair of parallel planar plates. This location thus depends on the deflection electrode structure along the tube axis. This location is called the deflection center.

Assume as shown in FIG. 15 that the photoelectron beam travelling along the tube axis is incident on the deflection electrodes wherein the photoelectron beam is bent while passing through the deflection electrodes and travels along the straight line with such a voltage gradient as defined by the deflection. Let the straight line extend in the direction opposite the direction of travel of the photoelectron beam. This line goes across the other line in the direction of the tube axis at point P which is defined in terms of the deflection electrodes. Point P is independent of the deflection angle. The photoelectron beam is recognized to diverge from point P and the point P is called the deflection center. The photoelectronic image may be formed on the plane perpendicular to the tube axis at point P.

Figure 16:
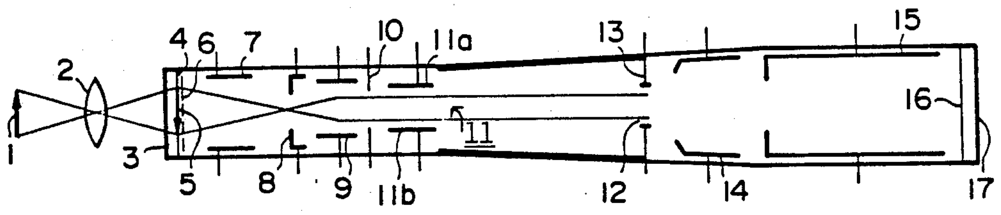
FIG. 16 is a cutaway view of a third embodiment of the high-speed frame pick-up camera in accordance with the second objective of the present invention.
Figure 17:
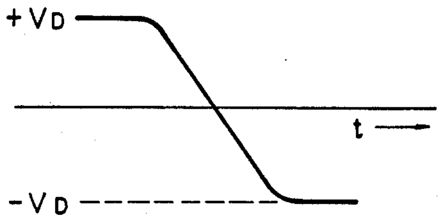
FIG. 17 is a graph illustrating the change in the voltage applied to the deflection electrodes of the high-speed frame pick-up camera in accordance with the second objective of the present invention.

FIG. 16 shows a cutaway view of the third embodiment of the electronic high-speed frame pick-up camera tube in accordance with the present invention when cut along the tube axis.

The structure within a sealed vacuum envelope consists of first electronic image forming means, photoelectron beam shutter means to determine the exposure time and second electronic image forming means.

The first electronic image forming means consists of sealed light-incident window 3 constituting a portion on a sealed wall and providing a capability to receive an incident image, photoelectric layer 4 to convert into photoelectronic image frames the incident image frames formed on the rear side of the sealed light-incident window 3, and a plurality of electrodes to form an image on the plane perpendicular to the tube axis in accordance with photoelectric image 5 generated from the photoelectric layer while the photoelectron beam is passing through the center of a pair of deflection electrodes 11 arranged along the tube axis.

A plurality of the electrodes which are sequentially arranged along the tube axis normal to the photoelectric layer 4 at the center thereof consist of mesh electrode 6 symmetrical with respect to the tube axis, first focusing electrode 7, first anode 8 with an aperture at the center thereof, electron beam angle adjustment electrode 9 to adjust the angle of the photoelectron beam when the photoelectron beam is incident on the deflection electrodes and second electron image forming means, and shielding electrode 10 to shield the electric field formed by the respective electrodes so that the potentials at deflection electrodes 11 arranged adjacent to the electron beam angle adjustment means 9 do not interact with other electrodes and providing an aperture at the center whereof the photoelectron beam can pass through.

The photoelectron beam shutter means are provided to determine the exposure time. The photoelectron beam shutter means consists of a pair of deflection electrodes 11 and photoelectron beam blocking electrode 13 providing an aperture that is suited to block the photoelectron beam.

Deflection electrodes 11 consisting of a pair of planar metal plates 11*a* and 11*b* are used to deflect the photoelectron beam emitted from photoelectric layer 4.

The photoelectron beam blocking electrode 13 provides aperture 12 that is suited to project the photoelectron beam onto the screen when the photoelectron beam can pass through the aperture for the time defined in each frame as exposure time $T_1$. The aperture may be of circular structure or of rectangular structure whose one side is parallel with the plane of the drawing and the other side is perpendicular to the plane of the drawing.

Exposure time $T_1$ is given by the time that the electron beam being scanned passes through the aperture.

The second electronic image forming means provide the capability to re-form a photoelectronic image frame formed on the plane in the intermediate location of the deflection electrodes along the tube axis and to project the frame on phosphor layer or screen 16.

The second electronic image forming means consists of second focusing electrode 14, second anode 15, screen 16 made by deposited phosphor layer, and sealed light-emitting window 17, which are arranged along the line (or axis) leading from the center of the deflection electrodes 11 to that of aperture 12.

Figure 18:
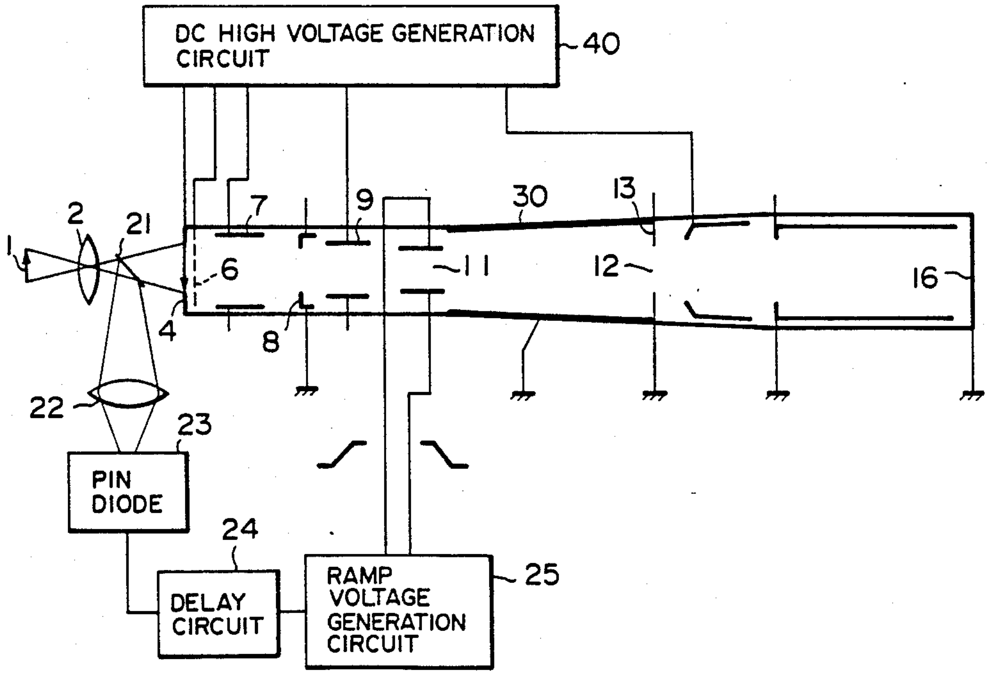
FIG. 18 is a block diagram of the third embodiment of the high-speed frame pick-up camera in accordance with the second objective of the present invention.

FIG. 18 shows the block diagram of this third embodiment of the high-speed, frame pick-up camera in accordance with the second objective of the present invention.

Since the electron tube of the high-speed, frame pick-up camera has been described referring to FIG. 16, it is schematically described in FIG. 18.

Optical lens 2 is used to form on photoelectric layer 4 the image of an object 1 being observed.

Half-mirror 21 is arranged in a space between lens 2 and photoelectric layer 4, and the light from object 1 being observed is partly led down to lens 22.

The light led from object 1 being observed is led to PIN diode 23 operated as a high-speed light sensor after passing through lens 22.

The output of PIN diode 23 is fed to delay circuit 24 wherein the output is delayed by the specified time so as to feed it to ramp voltage generation circuit 25. Ramp voltage generation circuit 25, which drives the deflection electrodes 11 operated as deflection means in the present invention, is started by both PIN diode 23 and delay circuit 24.

The gradient of the ramp voltage can arbitrarily be specified by the time interval between adjacent frames of an image being observed or by the exposure time.

The trigger to specify the start of the ramp voltage determining the starting time of the image frames to be displayed as outputs is generated by the starting circuit.

The operation voltages supplied from DC high voltage generation circuit 40 are applied to the electrodes of the first and second electronic image forming means.

The voltages and their changes at the respective electrodes will be explained hereinafter.

The operation of this third embodiment of the high-speed frame pick-up camera will now be described.

The optical image of the object being observed, whose structure and brightness may change at high speed, is incident on photoelectric layer 4 passing through optical lens 2 and sealed window 3.

Photoelectric layer 4 can respond to the optical image change, if any, in less than 1 ps, and the optical image is converted into the corresponding photoelectronic image at extremely high speed.

An operating voltage of −10 kV DC supplied from DC high voltage generation circuit 40 is applied to photoelectric layer 4, and a voltage of −8.5 kV DC is applied to mesh electrode 6 located adjacent to photoelectric layer 4. The electron beam forming this photoelectronic image is thus accelerated in the direction of mesh electrode 6.

Figure 19:
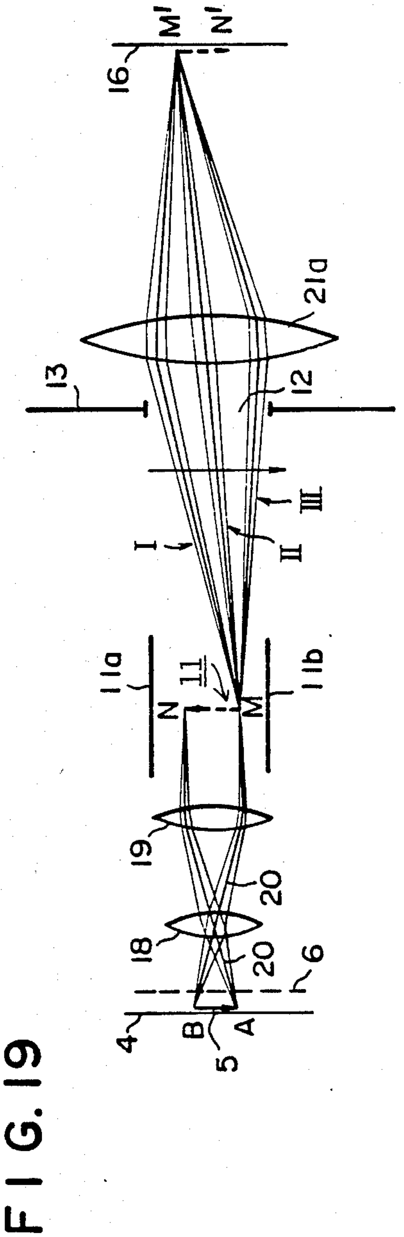
FIG. 19 shows the electro-optical system in the third embodiment of the present invention.

Since the light is continuously incident on the photoelectric layer 4, photoelectrons are successively generated and the photoelectron beam emitted from photoelectric layer 4 travels toward deflection electrodes 11 along the tube axis. The cross-sectional area of the photoelectron beam, perpendicular to the tube axis, stores two-dimensional information representing the structure and brightness of the optical image frames at each time in the form of the spatial electron density. Two-dimensional information stored in the cross-sectional area of the photoelectron beam starting from photoelectric layer 4 travels along the tube axis toward deflection electrodes 11 as time elapses. Photoelectronic image 5 becomes defocused as time goes on. If an appropriate DC voltage is applied to first focusing electrode 7, the photoelectronic image is re-formed in the cross-sectional area of the photoelctron beam perpendicular to the tube axis while passing through the intermediate location of the deflection electrodes 11. FIG. 19 shows the locuses of the electron beams in the opto-geometrical system drawn in place of the electro-optic system. In FIG. 19, the locuses of electrons forming points A and B on the photoelectronic image are shown. Reference number 20 indicates the main locuses of photoelectrons emitted from points A and B.

The locuses on both sides of the main locuses indicate the locuses of photoelectrons emitted from the photoelectric layer 4, each having an artitrary energy, and they have tangential lines with arbitrary angles with respect to the normal line to the photoelectric layer at points A and B. This type of locus is called the β-locus.

Main locus 20 can be plotted with respect to an arbitrary point on the optical image projected onto the photoelectric layer. However, main locuses 20 are plotted with respect to points A and B.

The main locuses are set in parallel with each other or concentrated by adjusting electron lens 19 when the photoelectron beam is passing through deflection electrodes 11 and apertures 12. Known is the fact that the divergent angles of the main locuses can be adjusted by electronic lens 19. Electron lenses 18 and 19, shown in FIG. 19, can be constructed mainly by using first focusing electrode 7 and electron beam angle adjustment electrode 9, as shown in FIG. 16, respectively.

In this third embodiment of the present invention, electron lens 18 consists of mesh electrode 6 whereto a voltage of −8.5 kV DC is applied, first focusing electrode 7 whereto −8.8 kV DC is applied, and first anode 8 whereto the common voltage is applied. Electron lens 19 consists of first anode 8 whereto the common voltage is applied, electron beam angle adjustment electrode 9 whereto a voltage of −7 kV DC is applied, and shielding electrode 10 whereto the common voltage is applied. An electronic image can be formed on the plane perpendicular to the tube axis while the electron beam is passing through the intermediate location of the deflection electrodes 11 along the tube axis. The main locuses are set in parallel with each other or concentrated by electron lens 19 when the photoelectron beam is passing through deflection electrodes 11 and apertures 12 because of the following operations which will be explained referring to the operation of the shutter means as well as formation of the next photoelectronic image.

The photoelectron beam incident on the plane at the intermediate location of the deflection electrodes 11 can be scanned on the surface of photoelectron beam blocking electrode 13 by the deflection voltage being applied to deflection electrodes 11.

Figure 20:
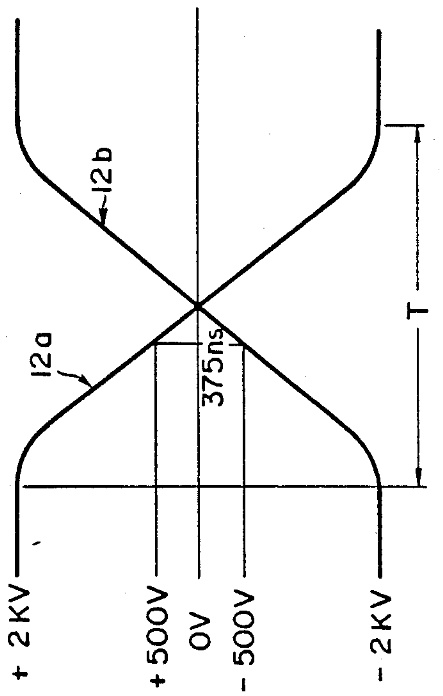
FIG. 20 shows waveforms of the voltages applied to the deflection electrodes in the third embodiment of the present invention.

FIG. 20 shows the waveform of the deflection voltage, wherein reference numbers 12*a* and 12*b* indicate the voltages which are applied to deflection electrodes 11*a* and 11*b*, respectively.

In this third embodiment of the present invention, a pair of symmetrical voltages are applied to a pair of deflection electrodes as shown in FIG. 20. However, it is possibel for scanning of the photoelectron beam that a ramp voltage is applied to one of the deflection electrodes while the other deflection electrode is kept at the common potential.

The deflection electrodes are specified as 2 cm in width, 2 cm in length along the tube axis, and 1 cm in gap between a pair thereof. If a voltage of −10 kV DC is applied to photoelectric layer 4 with shielding electrode 10 kept at the common potential, photoelectrons which are accelerated by an energy of 10 keV are incident on a pair of deflection electrodes 11.

The photoelectron beam incident on a pair of deflection electrodes 11 is deflected only by the force normal to the tube axis.

The photoelectron beam speed along the tube axis remains unchanged after the beam is incident on the deflection electrodes 11. Since the length of deflection electrodes 11 along the tube axis is specified as 2 cm, the time passing the electron beam through the deflection electrodes 11 measures approximately 340 ps at an energy of 10 keV.

How to deflect the photoelectron beam passing through deflection electrodes 11 depends on whether the deflection voltages applied to the deflection electrodes are apparently unchanged or drastically changed while the photoelectron beam passes through the deflection electrodes 11.

Deflection of the photoelectron beam passing through deflection electrodes 11 in such a condition that the deflection voltages applied to the deflection electrodes 11 are apparently unchanged will be described hereinafter.

Consider that time T is specified as 1000 ns for such a deflection voltage waveform as shown in FIG. 20. The deflection voltage is unchanged at any position on the voltage gradient while the photoelectron beam moving at an energy of 10 KeV is passing by the deflection electrodes 11.

Next, define as zero the time that the ramp voltage starts rising as shown in FIG. 20. Then, voltages of +500 V and −500 V are applied to deflection electrodes 11*a* and 11*b* in a time of 375 ns after the start of the ramp voltage, respectively.

Figure 21:
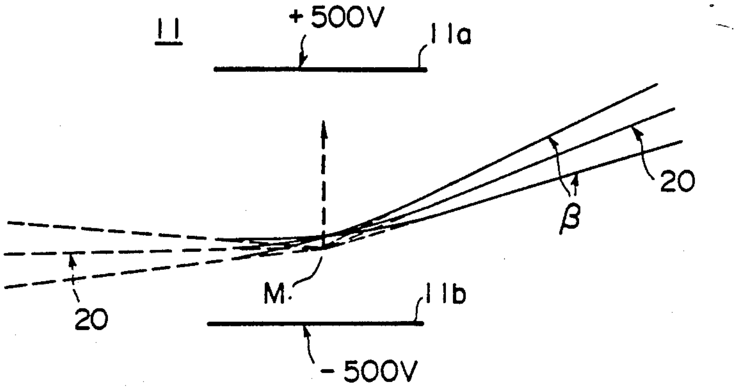
FIG. 21 shows the locuses of the electron beams passing through the deflection electrodes in the third embodiment of the present invention.

How to deflect the photoelectron beam passing through the deflection electrodes 11 when the above deflection voltage is applied to the deflection electrodes 11 will be described hereinafter with reference to FIG. 21.

The arrow M indicated by the broken line at the intermediate location of the deflection electrodes 11 perpendicular to the tube axis indicates the photoelectronic image formed when the deflection voltage applied to deflection electrodes 11 is kept at the common potential (which implies zero electric field for deflection).

The other three broken lines leading to point M from the left bottom of the arrow indicate the image to be formed by both the main and β locuses at point M when the deflection voltage is zero volt. The photoelectron beam travels along the straight line leading from the left edge of deflection electrodes 11 to point M because of zero electric field.

Although the locus extending beyond point M when the deflection voltage is zero volt is not indicated, the photoelectron beam travels along said straight line and thus the image becomes defocused.

However, a voltage of +500 V DC is applied to deflection electrode 11*a* and a voltage of −500 volts DC to deflection electrode 11*b*. The photoelectron beam which is incident on said deflection electrodes 11 is bent along the parabolic locuses as shown by the solid line in FIG. 21.

The photoelectron beam passing by said deflection elctrodes 11 is incident on both tube wall electrode 30 and photoelectron beam blocking electrode 13, which are kept at the common potential, whereto zero electric field is applied. The photoelectron beam thus travels along a straight line. That is, the photoelectron beam passing by the deflection electrodes 11 whereto an electric field for deflection is applied travels along the straight line with such a tangential angle that the main and $\beta$ locuses of the photoelectron beam go to point M when extending the locuses toward the inside of the deflection electrodes 11.

The above description explains the case that voltage of +500 V CD and −500 V DC are applied to a pair of deflection electrodes 11. However, the other voltages are applied to a pair of deflection electrodes 11 at any other time as shown in FIG. 20.

The position and tangential angle of the photoelectron beam passing by the deflection electrodes 11 are not the same as those obtained when voltages of +500 V DC and −500 V DC are applied to the deflection electrodes. However, the photoelectron beam passing by the deflection electrodes travels along the straight line with such a tangential angle that the main and $\beta$ locuses of the photoelectron beam go to point M when extending the locuses toward the inside of the deflection electrodes 11.

The photoelectron beam passing by the deflection electrodes 11 and travelling along such a straight line that the photoelectron beam is focused at point M when a zero electric field is applied to a pair of deflection electrodes 11 is equivalent to the photoelectron beam dispatched from point M along an arbitrary line. This relation holds for any photoelectron beam angle other than that for a zero electric field.

Although the above description explains the operations referring to point M, the above relation holds for any other point than point M.

The present invention can be realized in accordance with the above principle.

Assume that the light is incident on a plane other than the intermediate plane of the deflection electrode 11 when the deflection voltage is other than zero volt. In this case, one can easily calculate the locuses and obtain the following: The photoelectron beam (travelling on the main and $\beta$ locuses) which diverges from an arbitrary point on the re-formed image is deflected by the deflection electrodes 11 passing by the deflection electrodes 11, and travelling along a straight line. The photoelectron beam thus moves as if the photoelectron beam seems to be dispatched from a specific point. The point whereat the straight line starts depends on the deflection voltage. That is, a different point is designated for a different deflection voltage. Unlike the photoelectronic image formed on the plane at the intermediate point of the deflection electrodes 11, the photoelectron beam travels as if the photoelectron beam is dispatched from different points for different deflection voltages.

The above is the reason that a photoelectronic image is formed on the plane perpendicular to the tube axis in the intermediate location of the deflection electrodes 11.

If time T is specified as 1.5 ns in such a deflection voltage waveform as shown in FIG. 20, the time required to pass the photoelectron beam through the deflection electrodes 11 is of approximately 340 ps and the voltage applied to the deflection electrodes 11 may change during this time.

In a situation wherein the photoelectronic image generated from the photoelectric layer 4 is re-formed on the plane perpendicular to the tube axis after passing through the intermediate location of the deflection electrodes 11 along the tube axis when zero volt is applied to deflection electrodes 11, how to deflect the photoelectron beam has been discussed above.

The results are as follows:

The main and $\beta$ locuses diverging from arbitrary point Q on the plane of the photoelectronic image at the intermediate location of the deflection electrodes 11 whereto zero voltage is applied are focused on a specific point on the plane at the intermediate location of the deflection electrodes 11 perpendicular to the tube axis at an arbitrary point of time while the ramp-wave voltage is being generated. This designated point is located at a distance d apart from focusing point Q established when no electric field is applied to the deflection electrodes 11 on the intermediate plane in the direction which is opposite to that of photoelectron beam scanning. The specific distance d is given in terms of the length of deflection electrode 11, the speed of the photoelectron beam motion along the tube axis, and the deflection voltage change with time.

If the photoelectron beam is deflected to the left or right direction to such a great extent that the deflection voltage greatly changes while the photoelectron beam is passing through deflection electrodes 11, the photoelectronic image is formed on the plane at the intermediate location of the deflection electrodes perpendicular to the tube axis and shifted in the direction opposite to that of the photoelectron beam scanning by distance d from the photoelectronic image formed when zero deflection voltage is applied to the deflection electrodes. The photoelectron beam seems to linearly diverge from the above virtual light source.

The photoelectron beam is moved by the ramp voltage applied to the deflection electrodes 11 on the apertures of photoelectron beam blocking electrode 13 as shown in FIG. 19. However, the photoelectron beam seems to linearly diverge from the virtual quiescent photoelectronic image source within the deflection electrodes 11.

When the photoelctron beam is incident on electron lens 21 with such a diameter that the spherical aberration can be disregarded, electron lens 21 is used to form a virtual quiescent image on the respective screen although the photoelectron beam is scanned by shifting the electron lens 21.

FIG. 19 shows the motion of beams I, II and III when the deflection voltage is recognized to be unchanged while the photoelectron beam is passing through the deflection electrodes 11. FIG. 19 shows the photoelectron beam consisting of both main and $\beta$ locuses through which electrons forming point B of photoelectronic image 5 on the photoelectric layer when zero deflection voltage is applied to the deflection electrodes 11 are focused at point M on the plane at the intermediate location of the deflection electrodes 11. The photoelectron beam is deflected in the direction indicated by arrows in FIG. 19 by deflection electric field in such a manner that beams I, II and III successively appear in FIG. 19 as deflection is carried out. Photoelectron beams I, II and III are recognized to linearly diverge from point M, and they are focused on point M′ by electronic lens 21.

Beams I and III are the beams which have passed through opposite edges of apertures 12, and the scanning time between the time that the beam locus is given as beam I and the time that the beam locus is given as beam III is the exposure time.

The photoelectron beam passing through point B is focused on point M′ during exposure time. The photoelectron beam passing through another point, i.e., point A, is focused on point N'.

The photoelectronic image is focused on the point shifted upward by distance d from that indicated by points M and N within the deflection electrodes 11 in FIG. 19 even if the deflection voltage is changed while the photoelectron beam is passing through the deflection electrodes 11.

This implies that the reproduced image on the phosphor layer cannot be defocused by the shift of the image due to the electric field change by deflection even if the ramp voltage is being applied to the deflection electrodes. Thus, the image on the phosphor layer can be held in the quiescent state not by the staircase waveform which is applied to the deflection electrodes 11 but by the ramp voltage waveform during exposure time.

The time required for the photoelectron eam deflected by the deflection electrodes 11 to travel across aperture 12 on photoelectron beam blocking electrode 13 defines the exposure time.

The main locuses which enter into the deflection electrodes 11 by electron lens 19 are set in parallel with each other or concentrated because the aperture length is to be elongated into the direction of deflection if the main locuses are spread before entering into the photoelectron beam blocking electrode 13 having an aperture. The spherical aberration is thus increased if electron lens 21 with a small diameter is used.

Second electronic image forming means consists of electron lens 21 and phosphor layer 16 in FIG. 19.

Electron lens 21 consists of photoelectron beam blocking electrode 13 (kept at the common potnetial), second focusing electrode 14 (kept at −8 kV DC), and second anode 15 (kept at the common potential) as shown in FIG. 16. The electro-optical system is as described above. Three extremely-short exposure time frames of an image can successively be displayed on the respective screens 16 when part of the light from object 1 being observed is detected by the starting circuit if the ramp voltage is generated by the ramp voltage generation circuit 25.

Figure 22:
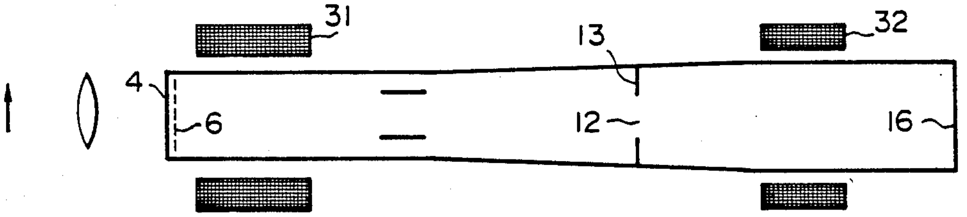
FIG. 22 is a cutaway view of a fourth embodiment of the high-speed frame pick-up camera in accordance with the second objective of the present invention.

The first and second electronic lenses 18 and 19 in the preferred embodiment of the present invention can be replaced by such magnetic field focusing coils as shown in FIG. 22. First focusing coil 31 can be used in place of such an electronic lens as shown in FIG. 22. Second focusing coil 32 can be used in place of electronic lens 21.

Figure 23A:
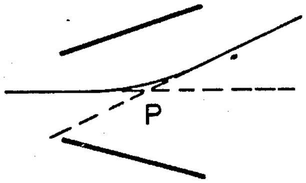
FIGS. 23(A) and 23(B) show variations of the static deflection means in the fourth embodiment of the present invention.
Figure 23B:
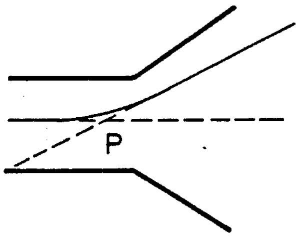

In the third embodiment of the present invention mesh electrode 6 is used. Mesh electrode 6 is not always necessary but the exposure time ($T_1$) is limited to 10 ps or less unless mesh electrode 6 is used. Photoelectron beam angle adjustment electrode 9 is not always necessary but the aperture size is increased. This increases the size of the apparatus. A pair of deflection electrodes consisting of a pair of parallel planar electrodes are used in the preferred embodiment of the present invention. However, such deflection electrodes as shown in FIGS. 23(A) and 23(B) can also be used. The deflection electrodes shown in FIGS. 23(A) and 23(B) improve the deflection sensitivity and prevent the photoelectron beam from touching at the right-hand side edge thereof.

The improved deflection electrodes can be used for forming the photoelectronic image on the plane perpendicular to the tube axis at the specific location of the deflection electrodes. How to designate the above specific location is important, and this location is specified as the center of the deflection electrodes along the tube axis if the deflection electrodes consist of a pair of parallel planar plates. This location thus depends on the deflection electrode structure along the tube axis. This location is called the deflection center.

Assume as shown in FIG. 23 that the photoelectron beam travelling along the tube axis is incident on the deflection electrodes wherein the photoelectron beam is bent while passing through the deflection electrodes and travels along the straight line with such a voltage gradient as defined by deflection. Let the straight line extend in the direction opposite the direction of travel of the photoelectron beam. This line goes across the other line in the direction of the tube axis at point P which is defined in terms of the deflection electrodes. Point P is independent of the deflection angle. The photoelectron beam is recognized to diverge from point P and the point P is called the deflection center. The photoelectronic image may be formed on the plane perpendicular to the tube axis at point P.

As described above, the first embodiment of the high-speed frame pick-up camera in accordance with the present invention has a plurality of second electron lenses wherein image frames are dissected and the exposure time is defined. The second electron lenses do not require the shuttering action as realized by the mesh electrode of the conventional frame pick-up camera and thus the problem encountered in distortion of the shuttering voltage applied to the mesh electrode is completely solved.

The operating voltages used to determine the exposure time of the photoelectron beam and arrangement of a plurality of frames are simple compared with the conventional camera. That is, one or a pair of ramp voltages are required to be applied to the respective electrodes.

If the exposure time and time span between exposures are of the order of 10 ns or less in the conventional frame pick-up camera, the reproduced image is defocused. However, no such problem can occur in the first embodiment of the high-speed frame pick-up camera in accordance with the first objective of the present invention.

On the contrary, the third embodiment of the high-speed frame pick-up camera in accordance with the second objective of the present invention has a second electron lens wherein the exposure time is defined. The second electron lens does not require the shuttering action as realized by the mesh electrode of the conventional frame pick-up camera and thus the problem encountered in distortion of the shuttering voltage applied to the mesh electrode is completely solved.

The operating voltages used to determine the exposure time of the photoelectron beam are simple compared with the conventional camera. That is, one or pair of ramp voltages are required to be applied to the respective electrodes.

If the exposure time is of the order of 10 ns or less in the conventional frame pick-up camera, the reproduced image is defocused. However, no such problem can occur in the third embodiment of the high-speed frame pick-up camera in accordance with the second objective of the present invention.

What is claimed is:

1. A high-speed frame pick-up camera for picking up the frames of a photoelectronic image formed on the photoelectric layer of an imaging tube comprising:

a first electron lens for reforming said photoelectronic image;

deflection means arranged so that the re-formed image of said photoelectronic image is located at the deflection center thereof;

a plurality of second electron lenses each having a central axis arranged to correspond with said deflection center so that the electron beam deflected by said deflection means is successively received thereby, a plurality of image frames being formed by said second electron means;

a plurality of phosphor layers respectively arranged in the locations of said image frames;

a lens drive circuit for supplying power to said first and second electron lenses; and a deflection means drive circuit for supplying power to said deflection means.

2. A high-speed frame pick-up camera as claimed in claim 1, wherein said first and second electron lenses are one of the static focusing type and the magnetic focusing type.

3. A high-speed frame pick-up camera for picking up frames of a photoelectronic image formed on the photoelectric layer of am imaging tube comprising:

a first electron lens for reforming said photoelectronic image;

deflection means arranged so that the re-formed image of said photoelectronic image is located at the deflection center thereof;

a plurality of second electron lenses each having a central axis arranged to correspond with said deflection center so that the electron beam deflected by said deflection means is successively received thereby, a plurality of image frames being formed by said second electron means;

a plurality of phosphor layers respectively arranged in the locations of said image frames;

a lens drive circuit for supplying power to said first and second electron lenses;

a deflection means drive circuit for supplying power to said deflection means; and a starting circuit for starting operation of said deflection means, said starting circuit being synchronized with the light detected from the object being observed.

4. A high-speed frame pick-up camera as claimed in claim 3, wherein said plurality of second electron lenses are arranged in accordance with the angles specified by multiple times of deflection.

5. A high-speed frame pick-up camera as claimed in claim 3, wherein said starting circuit consists of a photosensor and a delay circuit for delaying the output signal of said photosensor, said starting circuit being arranged so that said plurality of image frames corresponds to the times during which said object is being observed.

6. A high-speed frame pick-up camera for picking up a frame of a photoelectronic image formed on the photoelectric layer of an imaging tube comprising:

a first electron lens for reforming said photoelectronic image;

deflection means arranged so that the re-formed image of said photoelectric image is located at the deflection center thereof;

a second electron lens arranged so that the electron beam deflected by said deflection means is successively received thereby, an image frame being formed by said second electron lens;

a phosphor layer arranged in the location of said image frame;

a lens drive circuit for supplying power to said first and second electron lenses; and a deflection means drive circuit for supplying power to said deflection means.

7. A high-speed frame pick-up camera as claimed in claim 6, wherein said first and second electron lenses are one of the static focusing type and the magnetic focusing type.

8. A high-speed frame pick-up camera for picking up a frame of a photoelectronic image formed on the photoelectric layer of am imaging tube, comprising:

a first electron lens for reforming said photoelectronic image;

deflection means arranged so that the re-formed image of said photoelectronic image is located at the deflection center thereof;

a second electron lens arranged so that the electron beam deflected by said deflection means is successively received thereby, an image frame being formed by said second electron lens;

a phosphor layer arranged in the location of said image frame;

a lens drive circuit for supplying power to said first and second electron lenses;

deflection means drive circuit for supplying power to said deflection means; and a starting circuit for starting operation of said deflection means, said starting circuit being synchronized with the light detected from the object being observed.

9. A high-speed frame pick-up camera as claimed in claim 8, wherein said starting circuit consists of a photosensor and a delay circuit for delaying the output signal of said photosensor, said starting circuit being arranged so that said image frame corresponds to an arbitrary time during which said object is being observed.

* * * * *